(12) United States Patent
Yasuda et al.

(10) Patent No.: US 6,216,538 B1
(45) Date of Patent: *Apr. 17, 2001

(54) PARTICLE HANDLING APPARATUS FOR HANDLING PARTICLES IN FLUID BY ACOUSTIC RADIATION PRESSURE

(75) Inventors: Kenji Yasuda, Saitama-ken; Shin-ichiro Umemura, Hachioji; Kenichi Kawabata, Saitama-ken; Kazuo Takeda, Higashimurayama; Kenko Uchida, Saitama-ken; Yoshinori Harada, Saitama-ken; Masao Kamahori, Saitama-ken; Kazuaki Sasaki, Saitama-ken, all of (JP)

(73) Assignee: Hitachi, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/742,695

(22) Filed: Nov. 4, 1996

Related U.S. Application Data

(63) Continuation of application No. 08/163,290, filed on Dec. 2, 1993, now abandoned.

(30) Foreign Application Priority Data

Dec. 2, 1992 (JP) .................................................. 4-322910
May 18, 1993 (JP) .................................................. 5-115920
Jun. 4, 1993 (JP) .................................................. 5-134312

(51) Int. Cl.$^7$ ............................ G01H 17/00; B01D 17/06

(52) U.S. Cl. ........................................ 73/570.5; 210/748

(58) Field of Search ........................... 73/61.75, 64.53, 73/626, 570.5; 210/748; 367/153, 138

(56) References Cited

U.S. PATENT DOCUMENTS

| Re. 33,524 | * | 1/1991 | Schram ............................... 210/748 |
| 4,055,491 | * | 10/1977 | Porath-Furedi ....................... 210/19 |
| 4,280,823 | * | 7/1981 | Szonntagh ............................. 55/15 |

(List continued on next page.)

OTHER PUBLICATIONS

Wu, Acoustical Tweezers, May 91, *J. Acoustical Soc. Am.* (5), PP 2140–2143.*

Table 6–2. Sonoluminescence in the Presence of Different Gases.

"Separation Devices Based on Forced Coincidence Response of Fluid–Filled Pipes", T. Tolt, et al, J. Acoust. Soc. Am. 91 (6), Jun. 1992, pp. 3152–3156.

"Fractionation of Suspensions Using Synchronized Ultrasonic and Flow Fields", Z. Mandralls, et al, Dept. of Chemical Engineering, Case Western Reserve University, Cleveland, OH, AIChE Journal, Feb. 1993, vol. 39, No. 2, pp. 197–206.

(List continued on next page.)

*Primary Examiner*—Hezron Williams
*Assistant Examiner*—Jay L. Politzer
(74) *Attorney, Agent, or Firm*—Antonelli, Terry, Stout & Kraus, LLP

(57) ABSTRACT

An ultrasonic manipulation apparatus has a plurality of ultrasonic wave oscillators arranged in two dimensions to trap, fix or move particles to an optional position in the solution or perform cell fusion by using a gradient force obtained by superposing one over another the gradient force fields generated by ultrasonic waves produced by a plurality of ultrasonic wave oscillators. The ultrasonic wave oscillators, functioning independently of one another, can emit ultrasonic waves with optional intensities and phases, and by using an external force produced by superposed gradient force fields generated by ultrasonic waves, particles are handled easily.

46 Claims, 21 Drawing Sheets

U.S. PATENT DOCUMENTS

| | | | |
|---|---|---|---|
| 4,393,708 | * | 7/1983 | Barmatz et al. ............... 73/505 |
| 4,475,921 | * | 10/1984 | Barmatz ..................... 23/313 R |
| 4,523,682 | * | 6/1985 | Barmatz et al. ............. 209/638 |
| 4,549,435 | * | 10/1985 | Barmatz et al. ............... 73/505 |
| 4,573,356 | * | 3/1986 | Barmatz et al. ............... 73/505 |
| 4,736,815 | * | 4/1988 | Barmatz et al. ............. 181/0.5 |
| 4,743,361 | * | 5/1988 | Schram ............................ 209/1 |
| 4,877,516 | * | 10/1989 | Schram ......................... 209/155 |
| 4,890,268 | * | 12/1989 | Smith et al. ................. 367/138 |
| 5,006,266 | * | 4/1991 | Schram .......................... 210/748 |
| 5,036,944 | | 8/1991 | Danley et al. ............... 181/0.5 |
| 5,060,651 | * | 10/1991 | Kondo et al. ................ 600/443 |
| 5,085,783 | * | 2/1992 | Feke et al. ................... 210/748 |
| 5,091,893 | * | 2/1992 | Smith et al. ................. 367/153 |
| 5,147,562 | * | 9/1992 | Heyman ........................ 210/748 |
| 5,164,094 | * | 11/1992 | Stuckart ........................ 210/708 |
| 5,192,450 | * | 3/1993 | Heyman ........................ 210/748 |
| 5,225,089 | * | 7/1993 | Benes et al. ................. 210/748 |
| 5,257,676 | | 11/1993 | Merkley et al. ............ 181/0.5 |
| 5,329,496 | * | 7/1994 | Smith ............................. 367/140 |
| 5,419,877 | * | 5/1995 | Goforth et al. ............. 422/177 |
| 5,460,181 | * | 10/1995 | Seyed-Bolorforosh ......... 128/661.01 |
| 5,484,537 | * | 1/1996 | Whitworth .................... 210/748 |
| 5,527,460 | * | 6/1996 | Trampler et al. ............. 210/198.1 |
| 5,831,166 | * | 11/1998 | Kozuka et al. ............... 73/570 |
| 5,902,489 | * | 5/1999 | Yasuda et al. ................ 210/748 |
| 6,029,518 | * | 2/2000 | Oeftering ...................... 73/570.5 |

OTHER PUBLICATIONS

"Separation of Dispersed Phases From Liquids in Acoustically Driven Chambers", T. Tolt et al, Dept. of Materials Science and Engineering, Case Western Reserve University, Cleveland, OH, Chemical Engineering Science, vol. 48, No. 3, pp. 527–540, 1993.

"Acoustic Radiation Pressure—Principles and Application to Separation Science", R. Apfel, Yale Acoustics Laboratory, pp. 19–36.

"Concentration and Fractionation of Small Particles in Liquid by Ultrasound", K. Yasuda et al, Japan J. Appl. Phys. vol. 34, (1995), pp. 2715–2720, Part 1, No. 5B, May 1995.

* cited by examiner

IRIDIUM

POLYETHYLENE

CONSTRUCTION DIAGRAM OF BASIC ARRANGEMENT SEEN FROM SIDE

POTENTIAL DISTRIBUTION ON Z-AXIS

CONSTRUCTION DIAGRAM SEEN FROM ABOVE

POTENTIAL DISTRIBUTION ON Z-AXIS WHEN m=1

PARTICLE HANDLING APPARATUS FOR HANDLING PARTICLES IN FLUID BY ACOUSTIC RADIATION PRESSURE

This application is a continuation application of Ser. No. 08/163,290, filed Dec. 2, 1992, now abandoned.

BACKGROUND OF THE INVENTION

The present invention relates to a particle handling apparatus for handling particles in a fluid by acoustic radiation pressure in a wide variety of purposes, including the confinement or fusion in a fluid of particles, such as plastic particles and granular polymeric substance particles or bioparticles, such as microorganisms, tissue cell sections, ova or sperm, the trapping of the above-mentioned particles, the transportation in a liquid of the above-mentioned particles, the concentration or removal of the above-mentioned particles, and furthermore, applications to the diffraction and scattering of light by controlling the arrangement of particles of different indices of refraction, all by utilizing a force exerted on the particles when they are subjected to the acoustic radiation pressure in a fluid.

For trapping a particle, in addition to the conventional means of physically making a direct catch with microtweezers, a microneedle or the like, attempts have been made to create means of indirectly trapping a particle by use of a force potential wall produced by electromagnetic waves, light, or acoustic waves.

The means of trapping with tweezers or a microneedle, though this is an easy, simple and secure means, physically contacts a particle and therefore, the size of a particle that can be trapped depends a great deal upon the machining accuracy and the machining limit of the tweezers, microneedle, or the like. In addition, since this method traps a particle by direct contact, there is a possibility of destroying or deforming the particle. Furthermore, when moving a particle that is trapped, the tweezers, microneedle or the like is moved mechanically, and therefore, the particle cannot be moved with higher accuracy than the driving accuracy of a stepping motor or the like.

The trapping means utilizing a force potential wall generated by electromagnetic waves is effective in trapping a particle in which an electric charge can be induced. The electric fields can be superposed one over another. Therefore, by using an adequate superposition method, a gradient force field can be produced with relative ease in any position, so that a particle can be trapped by an electric attraction or repulsion with accuracy exceeding the limit of machining. The notable features of the indirect trapping method using a force potential wall are that there is no risk of destruction or deformation of a particle by contact, that the magnitude of the trapping force can be varied freely by controlling the generating sources of the force potential wall, and that the particle can be set free by putting out the force potential wall. A problem with this method is that the force potential wall is generated by superposition of the electric fields, so that this method is not effective for trapping electrically neutral particles.

The trapping means by generating the force potential wall by a light beam has been used in an attempt to trap neutral particles and dielectric particles. By focusing a laser beam, a force potential wall is generated which has a maximum gradient force at the focal point maximum, and when a gradient force exceeding the scattering force of the incident laser light acts on a particle, this particle can be trapped. A problem with this method is that the trapping means is based on equilibrium between the scattering force and the gradient force, and therefore, for particles whose radius is sufficiently larger than the wavelength, the scattering force changes greatly depending on the shape of the particle. Accordingly, the applicability of this method is limited to the particles, in which the optical scattering does not change much with the direction of trapping. In this method, since the laser light is focused strongly in order to obtain a sufficient gradient force, an irreversible damage by light is done to the dielectric particles and biological particles. Furthermore, when optical measurement is performed, or on substances with sensitivity to light, this method cannot be used. In addition, it is necessary to build a large system, including a light source for generating a powerful laser, or devices, such as a device for guiding the laser beam from the light source to the focal point.

Trapping means utilizing a force potential wall by ultrasonic waves has been used in an attempt to trap polystyrene beads and eggs of a frog. There are various methods for generating a force potential wall. For example, in a paper in Journal of Acoustical Society of America, vol. 89, No. 5 (1991), pp. 2140–2143, it has been reported that in a solution, by two collimated focusing ultrasonic beam generators, ultrasonic waves of 3.5 MHz is produced continuously to form a force potential wall, and at the focal point, the author succeeded in trapping a 0.27-mm polystyrene bead. The author also succeeded in moving a particle in any desired direction by mechanically moving the ultrasonic wave generators. Additionally, with the particles trapped by ultrasonic waves of 3.5 MHz, he also succeeded in moving those particles about 1 $\mu$m, though only in the axial position, for each change of 0.01 MHz by varying the frequency of the electrical voltage applied to the transducers.

ACUSTICA Vol. 5 (1955) introduces in pp. 167–178 theoretical calculations and an experiment as to the behavior of particles in plane stationary waves and plane progressive waves of ultrasonic waves.

This paper shows that the factors causing particles to move a node or a loop of the acoustic radiation pressure consist of the sound velocity and the density of particles. The paper theoretically explains that if the particle's density-compressibility factor $F(\sigma, \lambda) > 0$, the particles gather at the position of a loop and if $F(\sigma, \lambda) < 0$, the particles gather at the position of a node, and demonstrates that the experimental results agree with the theoretical predictions in an experiment conducted using bubbles in water.

In this paper, the author predicted that the colloid of toluene, benzene or the like in water gathers at the position of a node of the acoustic pressure, while the colloid of nitrobenzene, mercury or the like in water gathers at the position of a loop of the acoustic pressure, he made this prediction from the densities and the sound velocity of those substances.

On the other hand, with regard to the method of generating an ultrasonic focal field having a controlled expanse, as shown in IEEE Transactions on Ultrasonics, Ferroelectrics, and Frequency Control, Vol. 39, No. 1, (1992), pp. 32–38, an attempt has been successfully achieved to generate an acoustic field having a field pattern of the m-th order Bessel function type field pattern around the focal point in front of the disk-shaped shell by arranging ultrasonic wave generators (transducers) in circumferential direction on the shell with a spherical curvature and providing the respective elements by ultrasonic waves with a phase distribution of 2 m$\pi$ around the whole circumference.

SUMMARY OF THE INVENTION

The above-mentioned conventional method was designed to trap a particle by forming a focal point by the ultrasonic wave generators mounted on the concave shell for focusing the ultrasonic waves. Therefore, this conventional method was unable to move a particle by moving the focal point relative to the ultrasonic wave generators without using mechanical means, nor can it trap a particle with a plurality of focal points formed simultaneously. No study was made with regard to particles, such as lead particles or the like. Furthermore, no consideration was given to particles with very small particle size, a force exerted on which particles by the acoustic radiation pressure.

It is an object of the present invention to provide a method which makes it theoretically possible to fix a particle at any position, move and transport it in any direction with any speed.

It is another object of the present invention to provide a method for causing particles or the like existing in a specific range to gather or a method for excluding particles or the like existing in a specific range.

An aspect of the present invention is that in a system in which ultrasonic wave generators formed by a plurality of ultrasonic wave generating elements are arranged in a specific formation, and ultrasonic waves of a specific wavelength can be produced each with optional phase and intensity by the respective ultrasonic wave generating elements, the ultrasonic waves produced by the respective ultrasonic wave generating elements are superposed one over another, so that they are focused in any optional position and a force potential wall is produced at this focal point. The above objects of the present invention can be achieved, in order to move the trapped particles, by varying the phase and the intensities of the respective ultrasonic waves by the ultrasonic wave generating elements to thereby move the force potential wall in any optional direction or by producing a plurality of force potential walls one after another sequentially in specified positions with specified intensities.

DESCRIPTION OF THE PREFERRED EMBODIMENTS

Description will first be made of a gradient force F acting on a particle in a gradient force field generated by the acoustic pressure.

Figure 1A:
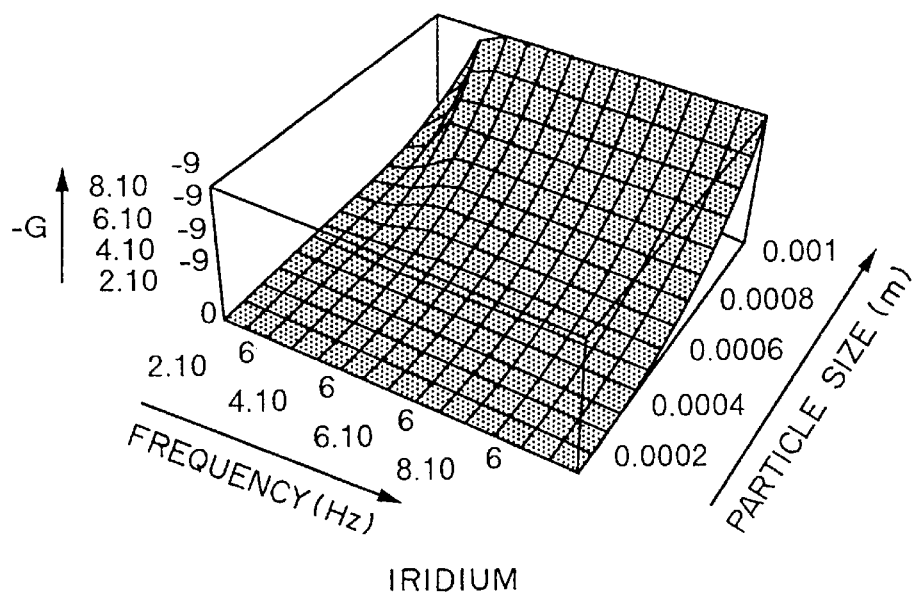
FIG. 1A is an explanatory diagram showing the relation between the magnitude of G factor in its minus direction and the gradient force acting on iridium particles.
Figure 1B:
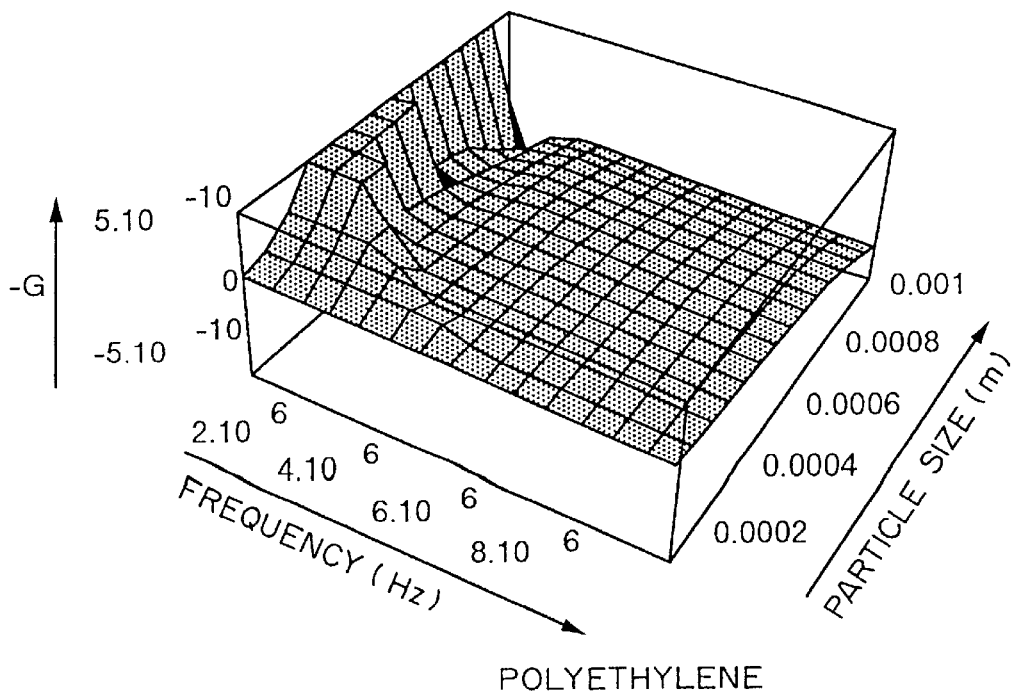
FIG. 1B is an explanatory diagram showing the relation between the magnitude of G factor in its minus direction and the gradient force acting on polystyrene particles.

The gradient force vector F, if I represents the intensity of ultrasonic waves and G (gravity) is a constant, can be expressed as follows.

$$F = -\nabla \Phi = -G \nabla I$$

where G is a value determined by the densities and sound velocities of water and the particles, and is positive for the particles of polystyrene or the like and negative for the particles, such as lead and iridium as shown in FIGS. 1A and 1B. In the case of particles for which G is positive, the potential $\Phi$ takes a minimum value at the focal point of the ultrasonic waves, so that those particles can be collected at the focal point. Conversely, in the case of particles for which G is negative, the potential $\Phi$ takes a maximum value, and as a result, those particles are acted on by a repulsive force from the focal point and tend to move away from the focal point. Therefore, by effectively using the above-mentioned properties, it is possible to discriminate the substances for which G is positive from the substances for which G is negative and trap desired particles selectively, thus making possible the kinds of selection and trapping of particles which were impossible by the conventional laser trapping method. Particularly when particles of a substance, for which G is positive, are to be trapped, by enclosing the particles with a force potential wall of maximum points of potential by arranging those maximum points sufficiently densely around the particles which are to be trapped, the particles can be trapped inside the wall.

With reference to FIGS. 2A, 2B, 3A and 3B, description will next be made of a basic arrangement for trapping a particle at the minimum point of potential at the focal point by using a gradient force field generated by focusing a plurality of ultrasonic waves.

Figure 2A:
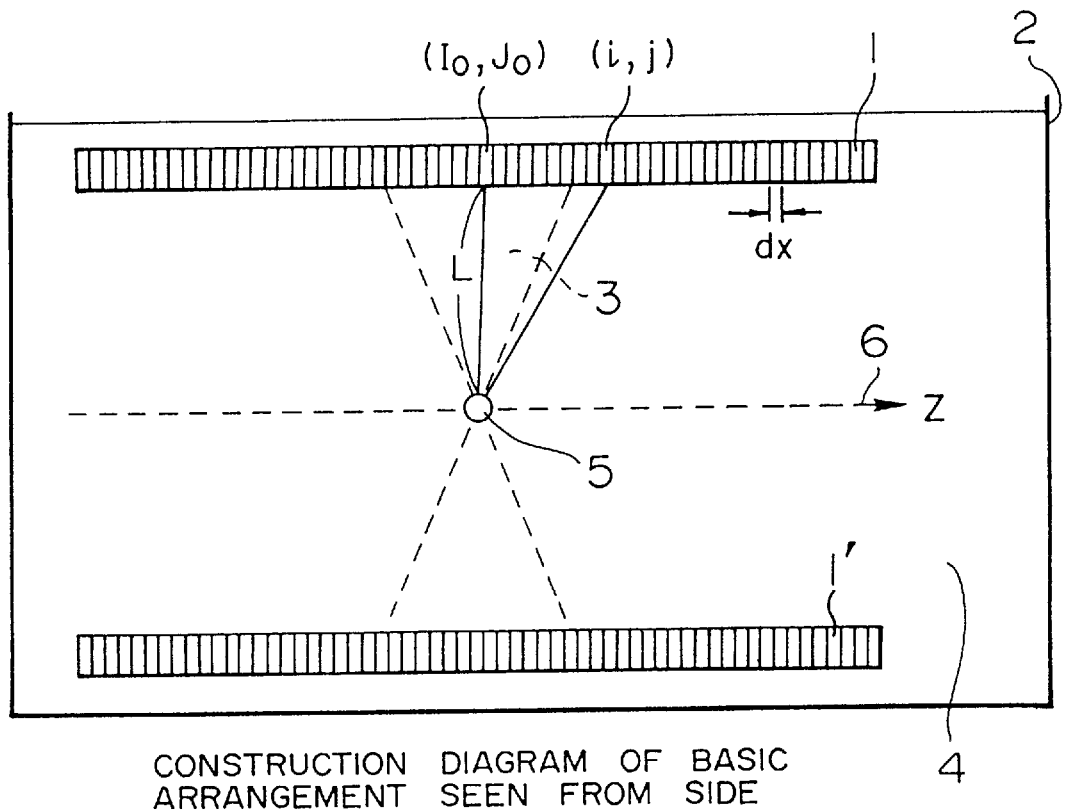
FIG. 2A is a construction diagram showing a first basic arrangement of an apparatus for trapping a particle by the force potential wall.

FIG. 2A is a construction diagram of a first basic arrangement for trapping a particle by the gradient force field. FIG. 2A schematically shows the construction, as seen from the side, of an ultrasonic trapping and transport apparatus, in which there are a pair of, that is, upper and lower ultrasonic wave generators 1 and 1' placed in a solution 4, each formed by ultrasonic wave generating elements arranged in two dimensions. With regard to the ultrasonic waves 3 sent out by the ultrasonic wave generator 1 having the oscillators arranged in two dimensions, the waveform A (i, j) of an oscillator element of number (i, j) out of N pieces of the ultrasonic wave generating elements can be expressed by equation (1).

$$A(i, j) = A_0(i, j) \cdot \text{Exp}[j(\omega t + \delta(i, j))] \quad (1)$$

where $A_0(i, j)$ is the amplitude of the ultrasonic wave oscillator of number (i, j) and $\delta(i, j)$ is a phase shift of the ultrasonic wave oscillator of number (i, j). In order to form the focal point just below the ultrasonic wave oscillator of number $(I_0, J_0)$, if the length of the perpendicular drawn from the oscillator element of number $(I_0, J_0)$ to the focal point is denoted by L and if the i-direction width and the j-direction width from each element of number (i, j) to the element of number $(I_0, J_0)$ are denoted by dx and dy, the phase $\delta(i, j)$, which the element of number (i, j) ought to have, is required to be expressed as shown in equation (2).

$$\delta(i, j) = 2\pi/\lambda(\sqrt{(dx \cdot (i - I_0))^2 + (dy \cdot (j - J_0))^2 + L^2} - L)$$

Figure 2B:
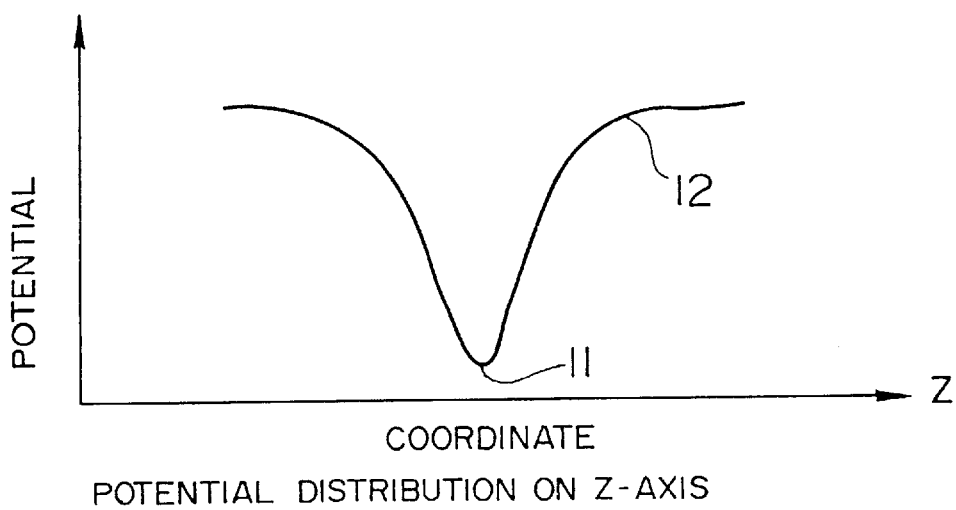
FIG. 2B is a characteristic diagram showing the potential of particles by the force potential wall.

Around the focal point thus formed, a gradient force field 12 is generated in the Z-axis direction as shown in FIG. 2B. Where G is positive, a particle moves in the direction of falling to the minimum point of the force potential field $\Phi$, formed by superposition of the gradient force fields by N pieces of the ultrasonic wave generating elements, and the particle comes to be stable at the minimum point 11.

Then, by varying the phase distribution of the respective ultrasonic wave generators 1, 1', the gradient force field is moved in the direction in which the particle 5 is to be moved, for example, in the direction shown by the arrow 6 to thereby move the minimum point of the gradient force field in that direction. Accordingly, the particle 5, which has been stable at the minimum point, moves with the movement of the minimum point. Furthermore, by selecting the number and the positions of the elements of the ultrasonic wave generators 1, 1' which generate the gradient force field 12, it is possible to generate a gradient force field of an optional magnitude in a specified range by superposition of gradient force fields, and as a result, all particles in the gradient force field can be collected at the minimum point.

Figure 3A:
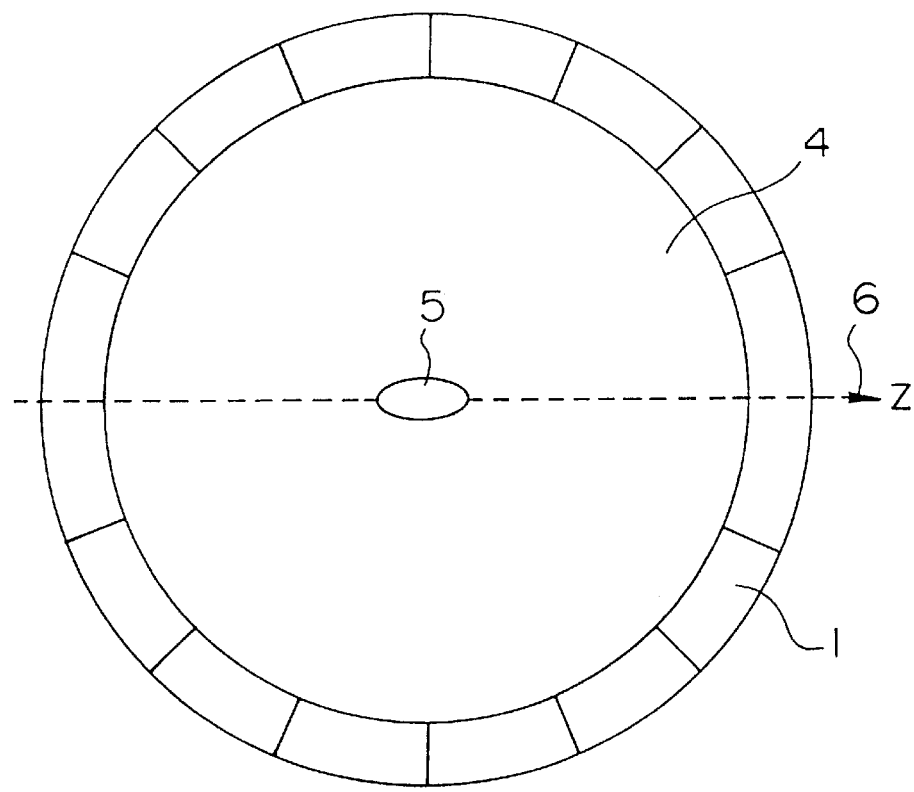
FIG. 3A is a construction diagram showing a second basic arrangement of an apparatus for trapping a particle by the force potential wall.

FIG. 3A is a construction diagram of a second basic arrangement for trapping a particle by the gradient force field in the present invention. FIG. 3A shows the construction, as seen from above, of an ultrasonic wave generator having N pieces of ultrasonic wave generating elements 1 arranged directed inwardly in the form of a doughnut in a solution 4.

If the ultrasonic wave generating elements are numbered 1 to N clockwise, an ultrasonic wave emitted by the i-th generating element is given by equation (3).

$$A(i) = A_0(i) \cdot \text{Exp}[j(\omega t + \delta(i))] \quad (3)$$

In equation (3), $A_0$ (i) denotes the amplitude of the i-th ultrasonic wave oscillator, and (i) denotes a phase shift of the i-th ultrasonic wave oscillator. To form a focal point at the center of the circumference, it is necessary to put $\delta(i) = 0$ for all of i. To form the focal point of ultrasonic waves to a point separate by a vector $\vec{r}$ from the center of the circle, it is required that the phase shift $\delta(i)$ of the i-th oscillator should be set to be an amount as shown by equation (4). However, the wave number vector of the i-th ultrasonic wave oscillator is set as $\vec{k}(i)$.

$$\delta(i) = \vec{k}(i) \cdot \vec{r} + 2\pi m \cdot (i/N) \quad (4)$$

Figure 3B:
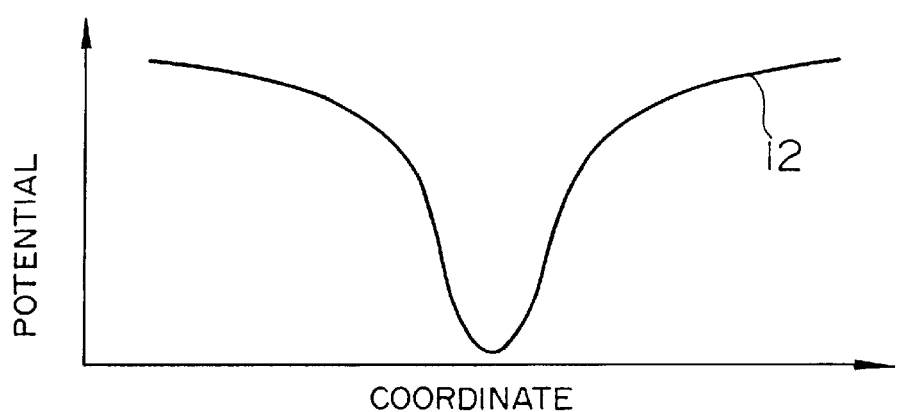
FIG. 3B is a characteristic diagram showing the potential of particles by the force potential wall.

When the offset δ(i) is 0, the superposition of N waves as in the earlier-mentioned paper by Umemura et al. is expressed as the m-th order Bessel function with its center at the center of the circle, and when m=0, a gradient force field 12 is generated as shown in FIG. 3B. The movement of the minimum point of this gradient force field from the center of the circle to an optional point can be achieved by changing the offset δ(i). Therefore, by gradually and smoothly changing δ(i), the particle trapped in this gradient force field can be moved.

In the case of a particle for which G is negative, if m is arranged to be 1 or more, a wall of maximum potential values is formed so as to encircle the position r, so that the particle can be trapped within this wall.

Description has been made of the cases where the incompressible fluid, such as water is used, but the above description applies also to the cases where a compressible fluid, such as a gas or the like is used. In the description of the following embodiments, only embodiments using a incompressible fluid are introduced for the sake of simplicity.

[Embodiments of Trapping and Moving a Particle]

Figure 4:
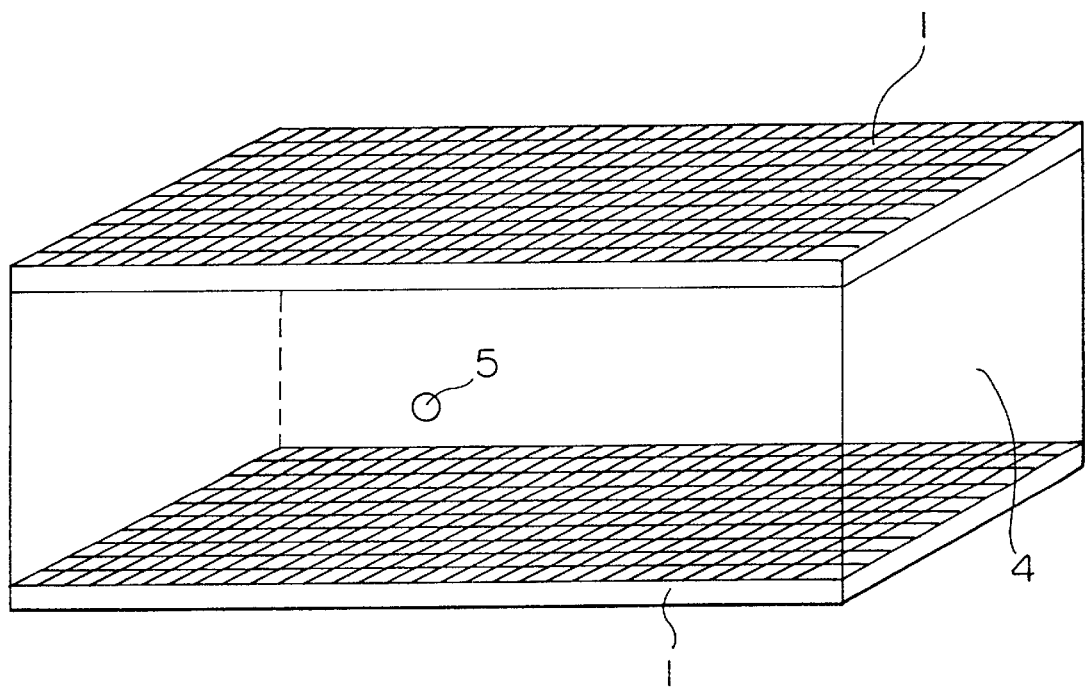
FIG. 4 is a construction diagram showing an ultrasonic manipulation apparatus according to a first embodiment of the present invention used in the first basic arrangement shown in FIG. 2A.

FIG. 4 is a construction diagram showing an embodiment of the present invention which is formed so as to trap and move a particle suspended in an aqueous solution by applying the above-mentioned first basic arrangement. As shown in FIG. 4A, a pair of ultrasonic wave generator main bodies formed by ultrasonic wave generating elements arranged in two dimensions on flat boards and they are filled with a solution 4, in which a particle 5 is suspended. The ultrasonic wave generating elements 1 each mounted on the flat board are formed of ZnO, PLDP ceramics, and so on. Since the ultrasonic wave generating elements of those types are transparent, the particle 5 in the solution 4 can be directly observed by looking through the ultrasonic wave generating elements from outside by a microscope or the like. The respective ultrasonic wave generating elements 1 are designed so that the intensities of ultrasonic waves they produce can be adjusted independently. Therefore, by using the principle and the method described with regard to the first basic arrangement in the above-mentioned paragraph on the operation, a 10-μm latex bead could be trapped and transported by ultrasonic waves of 3 MHz. Moreover, an egg of a frog could be trapped and transported in a non-destructive manner by ultrasonic waves of 3 MHz. In this case, the ultrasonic wave generating elements were arranged symmetrically at the upper and lower positions so as to suppress the streaming effect resulting from the focusing ultrasonic waves.

However, in the vicinity of the fixed flat boards or in the region close to the surface of water, no such a large flow of a fluid as to hinder the trapping of a particle by the gradient force field does not occur, with a result that a particle could be trapped and moved only with one flat board in which the ultrasonic wave generating elements are arranged.

Figure 5:
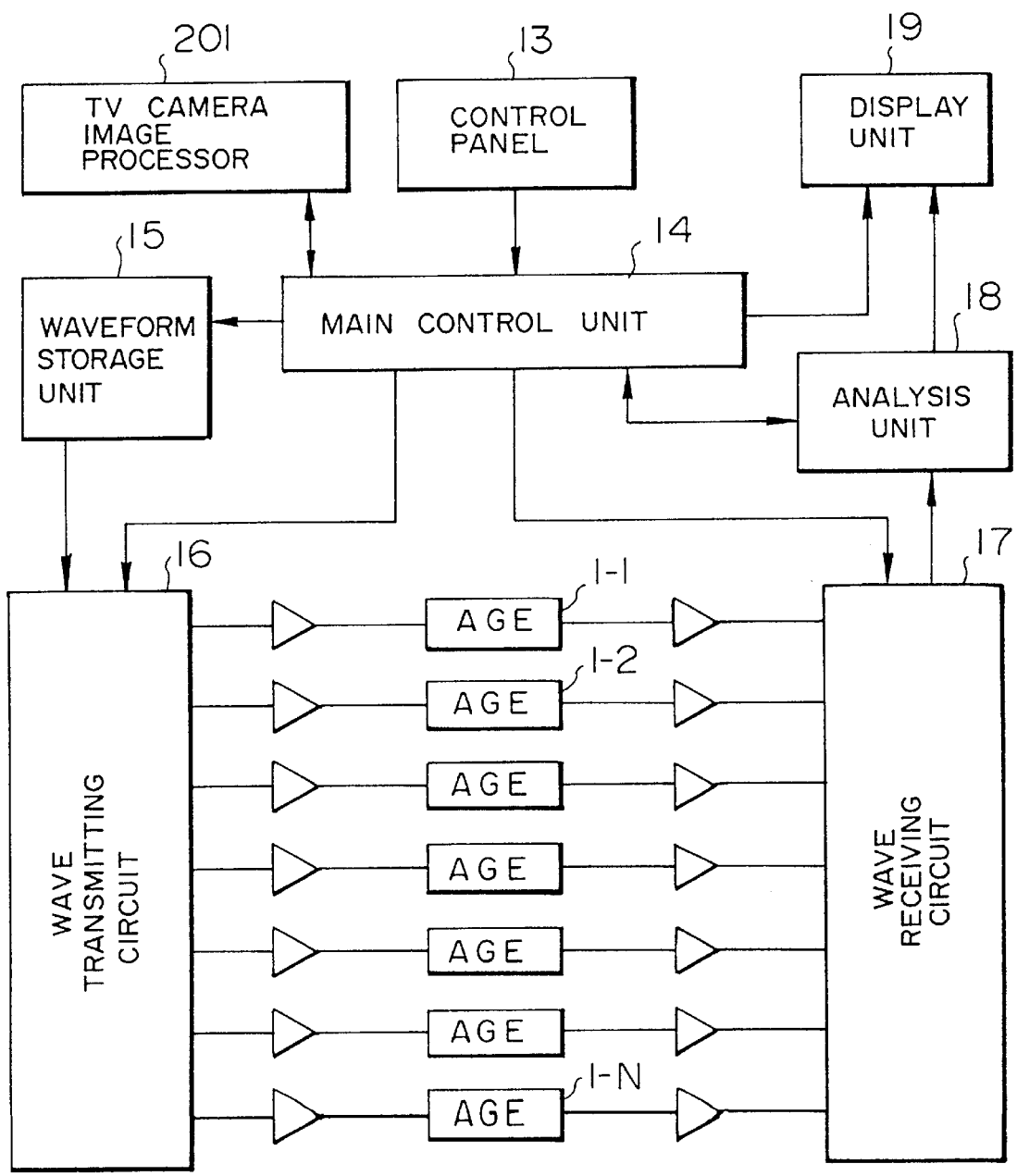
FIG. 5 is a block diagram showing the control circuit of the ultrasonic manipulation apparatus according to the first embodiment shown in FIG. 4.

FIG. 5 is a block diagram showing the construction of the ultrasonic wave control section in the embodiment described with reference to FIG. 4. This control section controls the ultrasonic waves generated by N pieces of ultrasonic wave generating elements 1-1, ..., 1-N shown in FIG. 4, and if the ultrasonic wave generating elements are switched over to ultrasonic wave sending/receiving elements, by receiving the echoes of the ultrasonic waves generated, the control section confirms the position where a particle exists. The control section can perform feedback control of ultrasonic waves to be generated next according to a procedure programmed before the start of operation based on data obtained by analysis of the acoustic echo images and the spatial distribution images of particles from the video camera, the image processor, etc. More specifically, desired coordinates of the minimum point of the gradient force field are input from a control panel 13 so that the minimum point may occur where a particle is to be trapped.

Then, the intensities, phases and offsets of the ultrasonic waves of the respective ultrasonic wave sending/receiving elements are set in a main control unit 14, and are output to a waveform storage unit 15. Data in the waveform storage unit 15 is read from a wave sending circuit 16 on receiving an output command from the main control unit 14. The wave sending circuit 16 sends out waveform output based on data of the waveform storage unit 15 to the N ultrasonic wave sending/receiving elements 1-1, ..., 1-N. To confirm the position of a particle by ultrasonic waves, the echoes of the transmitted ultrasonic waves are received again by the ultrasonic wave sending/receiving elements 1-1, ..., 1-N, and sent to a wave receiving circuit 17. Data from the wave receiving circuit 17 is passed through an analysis unit 18 to become basic data for feedback control, such as coordinates and displacement speed of a particle, etc. This basic data is sent to the main control circuit 14, and a display circuit 19. The main control circuit 14 enables feedback control of ultrasonic particle trapping to be implemented based on position data of the particles supplied from an analysis unit 18, a TV camera, and an image processing system 201.

Figure 6:
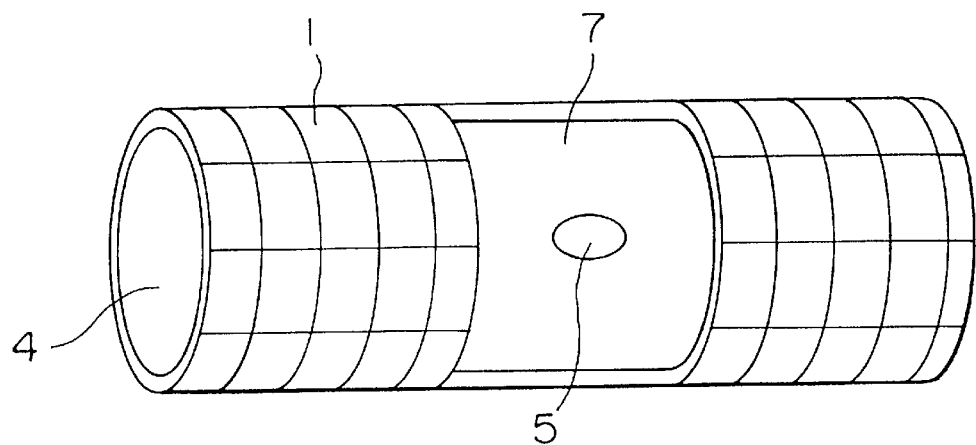
FIG. 6 is a construction diagram showing the ultrasonic manipulation apparatus according to a second embodiment used in the first basic arrangement shown in FIG. 2A.

FIG. 6 is a construction diagram showing an embodiment of the present invention formed so as to selectively trap and transport a particle in a tube filled with a solution by applying the above-mentioned first basic arrangement. In this apparatus, a plurality of ultrasonic wave sending/receiving elements, shown in FIG. 2A, are arranged on the surface of the tube as shown in FIG. 6. The thus arranged ultrasonic wave sending/receiving elements operate independently, and can send out ultrasonic waves with optional intensities and phases. At a region where a particle is to be trapped selectively, a window is provided for observation, and while observing from this window, a particle trapping operation is performed. After the particle is trapped, by using the principle and the method explained while describing the first basic arrangement in the above-mentioned paragraph on the operation, a 10-μm latex bead could be trapped and transported by ultrasonic waves of 3 MHz. An egg of a frog could be trapped and transported in non-destructive manner by ultrasonic waves of 3 MHz. For control of the individual ultrasonic wave sending/receiving elements 1, a control unit same as in the embodiment shown in FIG. 5 was used.

Figure 7A:
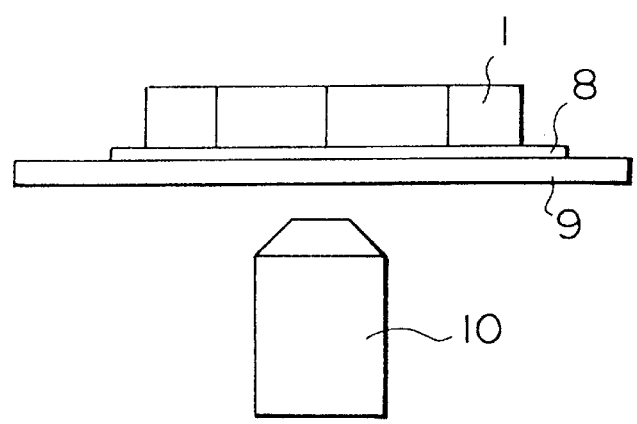
FIG. 7A is a plan view of the ultrasonic manipulation apparatus according to a third embodiment used in the second basic arrangement shown in FIG. 3A.
Figure 7B:
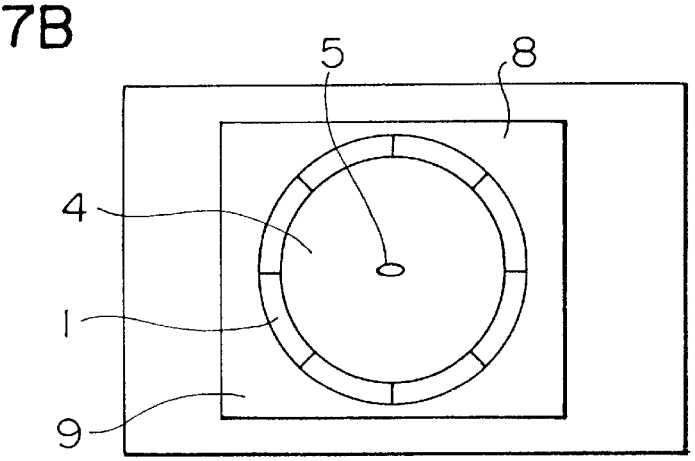
FIG. 7B is a side view of the ultrasonic manipulation apparatus according to the third embodiment used in the second basic arrangement shown in FIG. 3A.

FIGS. 7A and 7B are construction diagrams showing an embodiment of the present invention formed so as to trap a particle suspended in an aqueous solution by applying the above-mentioned second basic arrangement. FIGS. 7A and 7B show the construction, seen from the side and from above, of a third embodiment of the ultrasonic trapping apparatus and transport apparatus to which the basic arrangement of the present invention was applied. This is one of the embodiments characterized by the application of the above-mentioned second basic arrangement.

The ultrasonic trapping and transport apparatus main body comprising ultrasonic wave sending/receiving elements arranged in the shape of a doughnut as shown in FIG. 3A, is fixed to a plate of a microscope. The ultrasonic wave sending/receiving elements, which operate independently of each other, can produce ultrasonic waves with optional intensities and phases. The inside of the ultrasonic trapping and transport apparatus main body is filled with a solution, and the actual condition, phase differences and fluorescent images of substances existing in the solution can be observed at all times through the objective lens of a microscope. By generating ultrasonic waves with different phases as described with regard to the second basic arrangement in the above-mentioned section on the operation, a 10-μm latex bead could be trapped and transported by ultrasonic waves of 3 MHz. An egg of a frog could be trapped and transported non-destructively by ultrasonic waves of 3 MHz. In addition, by varying the phase offset, a particle could be transported. To control the individual ultrasonic wave sending/receiving elements 1, a control unit constructed as in the embodiment shown in FIG. 5 was used.

Figure 8:
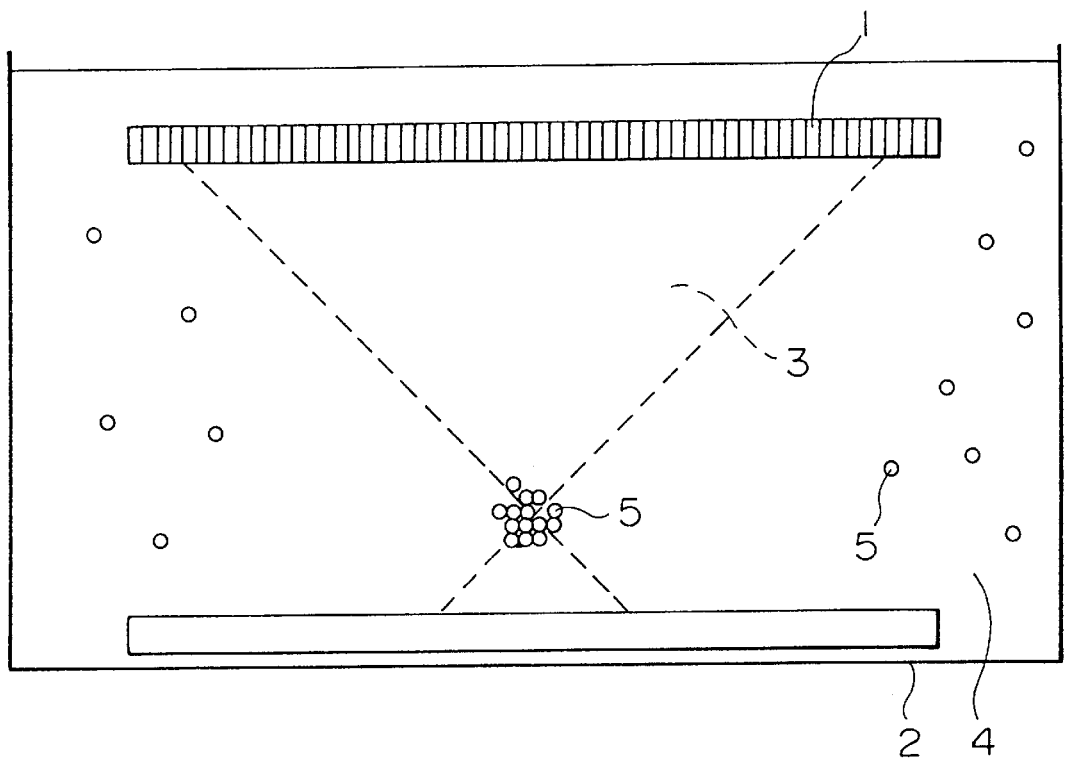
FIG. 8 is a construction diagram showing the ultrasonic manipulation apparatus according to a fourth embodiment used in the first basic arrangement shown in FIG. 2A.

FIG. 8 is a construction diagram showing an embodiment of the present invention formed so as to trap particles suspended in a fixed range in an aqueous solution, and collect them in one position. This is one of the embodiments characterized by the application of the above-mentioned first basic arrangement. As shown in FIG. 8, the ultrasonic trapping and transport apparatus main body arranged in two dimensions on a flat board is filled with a solution 4, in which a particle 5 is suspended. The ultrasonic wave sending/receiving elements 1 mounted on the flat board are formed of ZnO, PLDP ceramics or the like. The ultrasonic wave sending/receiving elements 1 are designed so that the intensities of ultrasonic waves they generate can be adjusted independently, and by using the principle and the method described with regard to the first basic arrangement in the above-mentioned section on the operation, the sperm of a sea urchin in a range of 1 $cm^3$ could be collected at the focal point non-destructively by ultrasonic waves of 3 MHz. For control of the individual ultrasonic wave sending/receiving elements 1, a control unit as in the embodiment shown in FIG. 5 was used.

Figure 9:
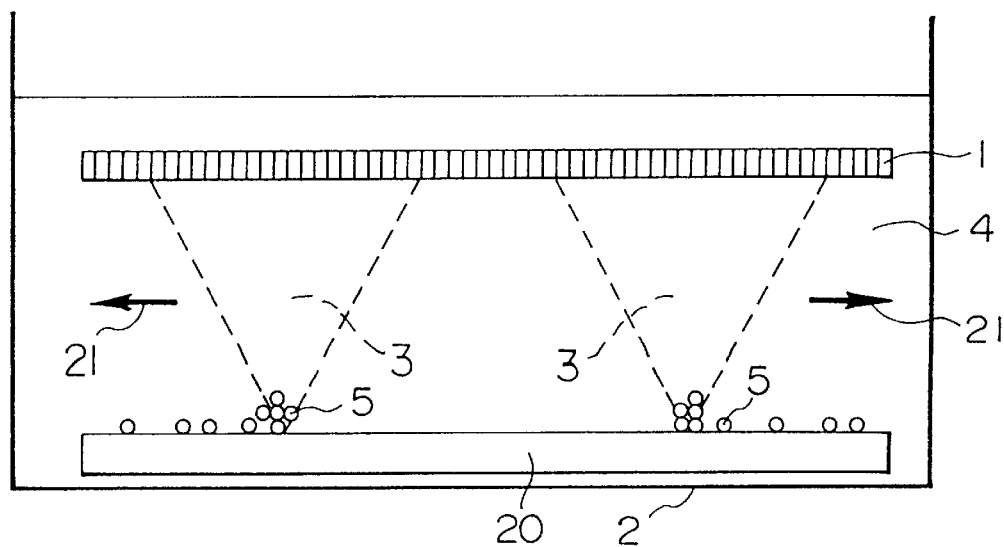
FIG. 9 is a construction diagram showing the ultrasonic manipulation apparatus according to a fifth embodiment used in the first basic arrangement shown in FIG. 2A.

FIG. 9 is a construction diagram showing an embodiment of the present invention formed so as to trap particles in an aqueous solution, and effectively remove dust in a specific range. This is one of the embodiments characterized by the application of the first basic arrangement mentioned above. The ultrasonic trapping and transport apparatus main body arranged in two dimensions on a flat board as shown in FIG. 9 is filled with a solution 4, and particles 5 adhere to the surface of a metal plate 20 placed in the solution.

The ultrasonic wave sending/receiving elements 1 mounted on the flat board are formed of ZnO, PLDP ceramics or the like. The intensities of the ultrasonic wave sending/receiving elements 1 can be adjusted independently, and by using the principle and the method explained with respect to the first embodiment in the paragraph on the operation. First of all, ultrasonic waves are focused at the center of the range from which dust is to be removed above the metal plate 20. Then, the position of the focal point of ultrasonic waves is displaced around the original focal point widely in the direction of the arrows 21 in FIG. 9, so that dust, including 5-μm latex beads or the like could be trapped and removed. For control of the individual ultrasonic wave sending/receiving elements 1, a control unit as in the embodiment shown in FIG. 5 was used.

In the description of the above five embodiments, cases have been introduced where a plurality of ultrasonic wave generators are arranged, and by controlling the phases and intensities of the ultrasonic waves, the gradient force field is generated by directly utilizing the acoustic fields generated by the ultrasonic wave generators. However, even when a smaller number of ultrasonic wave generators are arranged on the flat board with sufficient spaces provided between the elements, since the vibrations of those elements are transmitted through the flat board to which the elements are attached, it appears that the ultrasonic wave generators behave as if they are arranged tightly with one another without leaving spaces between them. In this arrangement, too, a gradient force field as in the above five cases can be generated, and particles can be trapped and transported in the same manner as in the above five cases.

Furthermore, as has been described in the paragraph on the operation, for particles for which G is negative, in the above five embodiments, by forming a plurality of focal points with maximum potential or by continuously forming such focal points around a particle to be trapped, the particle can be trapped.

Moreover, as has been described, in the above five embodiments, by forming a plurality of focal points with maximum potential or by continuously forming such focal points around a particle to be trapped, the particle can be trapped.

[Embodiments of Cell Fusion]

Figure 10:
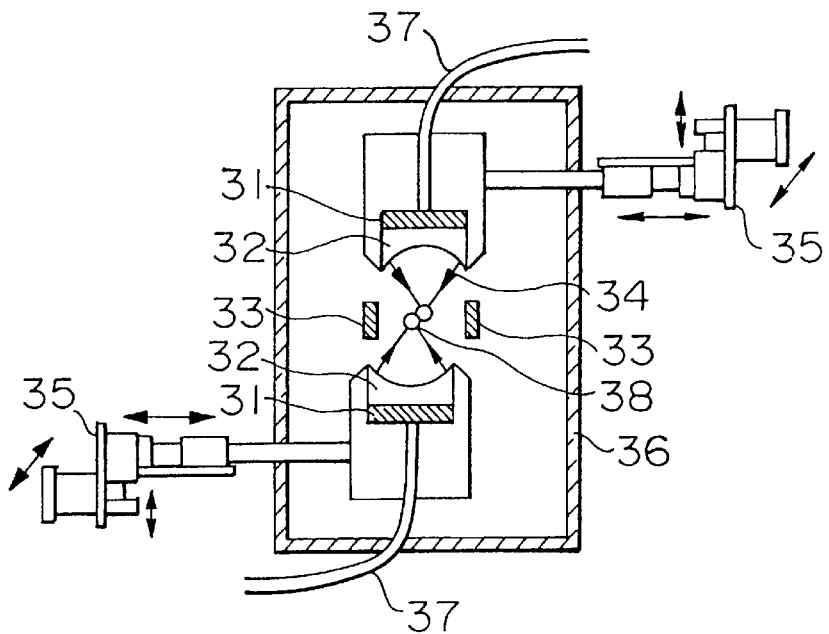
FIG. 10 is a construction diagram as seen from above, showing the ultrasonic manipulation apparatus according to a sixth embodiment used in the first basic arrangement shown in FIG. 2A.

FIG. 10 shows an embodiment for cell fusion, including a portion for trapping a particle by focusing ultrasonic waves and a portion for inducing a cell fusion in a high-voltage electric field. This embodiment is formed by adding a mechanism for mechanical movement control to the above-mentioned embodiment. Those portions are placed in a cell 36. The portion for focusing ultrasonic waves includes ultrasonic wave oscillators 31 and an acoustic lens 32, and can trap a cell at the focal point of ultrasonic waves. Reference numeral 37 denotes coaxial cables for acoustic transducers.

The position of the focal point can be moved by moving a unit, including an ultrasonic wave oscillator 31 and an acoustic lens 32 by a three-dimensional manipulation unit 35. By using this manipulation apparatus, cells to be fused together are moved between parallel electrode plates 33. With the apparatus according to this embodiment, cells of a particle diameter of 30 μm can be moved by using ultrasonic waves of 3 MHz. A portion for inducing a cell fusion in an electric field is formed by a pair of electrodes 33, 33, so that electric pulses can be applied to the cells. The two cells to be fused together are trapped each by a unit formed by an ultrasonic wave oscillator 31 and an acoustic lens 32, and are guided to between the electrodes 33, 33 by the three-dimensional manipulation unit 35, and by applying electric pulses to the cells brought into contact with each other, the cells are fused together.

To suppress the effect of cavitation, the dissolved gas in the solution in the cell 36 may be replaced by a triatomic gas of carbon dioxide, nitrous oxide or the like.

Figure 11:
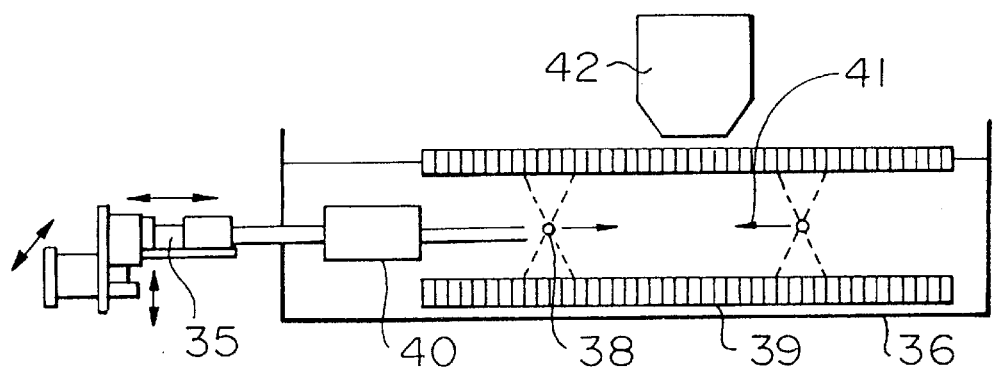
FIG. 11 is a construction diagram, as seen from the side, showing the ultrasonic manipulation apparatus according to a seventh embodiment used in the first basic arrangement shown in FIG. 2A.

FIG. 11 shows an embodiment for cell fusion, including a portion for trapping a particle by focusing ultrasonic waves, and a portion for inducing a cell fusion by injecting a cell fusion inducer from a pipetting unit. Those portions are placed in the cell 36. The portion for focusing ultrasonic waves are the same as the above-mentioned embodiment shown in FIG. 4, and more specifically, includes two boards 39, 39 in which the ultrasonic wave oscillators are arranged in two dimensions. How ultrasonic waves are generated by the ultrasonic wave oscillators arranged in two dimensions have already been described.

In equation (2), a phase obtained by adding together phases δ1 and δ2 for bringing the focal points to the two cells 38, 38 as the targets has to be added to an ultrasonic wave oscillator (i, j). By varying this phase to move the focal points in the directions of the arrows 41, 41, the two cells can be brought together in one position. With the apparatus in this embodiment, cells with a particle diameter of 30 μm can be trapped and moved by ultrasonic waves of 3 MHz.

A micro-pipetting unit 40 can inject ethylene glycol into the solution. This unit can be moved to any position by a micro-manipulator 35. After the cells to be fused are brought together by the above-mentioned ultrasonic trapping unit, by bringing the injection port of the micro-pipetting unit 40 close to the cells and injecting ethylene glycol, a cell fusion can be made to take place.

To make possible observation by a microscope 42, in this apparatus, transparent ultrasonic wave oscillators of ZnO, PLDP ceramics are used.

In this embodiment, a pair of two-dimensional arrays of transducers 39, 39 are used, but the same results can be obtained only by using a single piece of two-dimensional array of transducers 39. To suppress the effect of cavitation, the dissolved gas in the solution in the cell 36 may be replaced by a triatomic gas of carbon dioxide, nitrous oxide, or the like.

In this embodiment, ultrasonic waves are used as the means for trapping a particle as a target, and means for causing a chemical substance to act locally is used as the cell fusion means. However, the means for supplying the chemical substance for local action with this micro-pipetting unit may be used when a cell is trapped by pipette suction, an electric field trap, an optical trap, etc.

Figure 12:
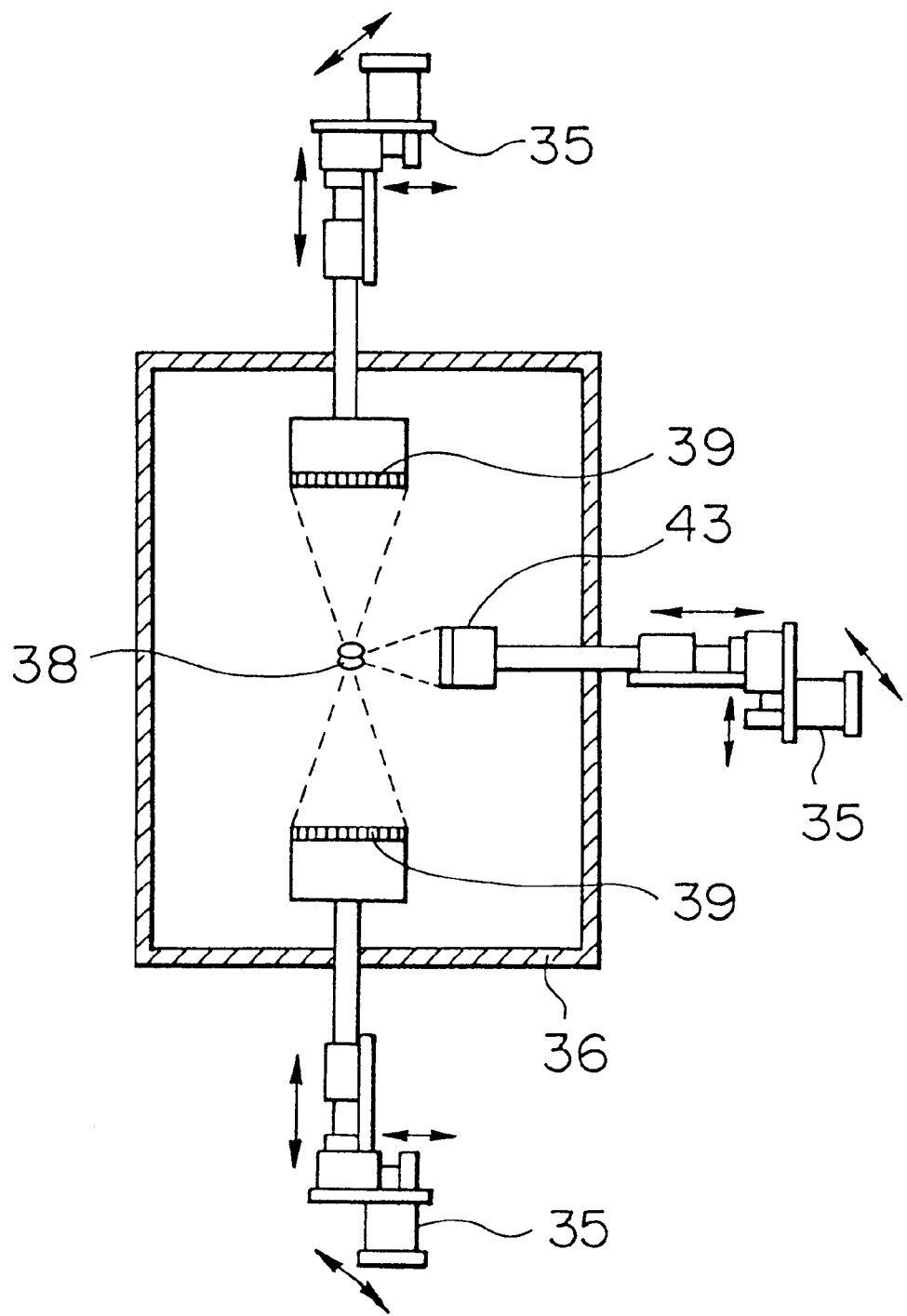
FIG. 12 is a construction diagram, as seen from above, showing the ultrasonic manipulation apparatus according to an eighth embodiment used in the first basic arrangement shown in FIGS. 2A.

FIG. 12 shows an embodiment of the cell fusion apparatus, including a portion for trapping a particle by focusing ultrasonic waves, and a portion for inducing a cell fusion by the focusing ultrasonic waves. Those portions are placed in the cell 36. Each portion for focusing ultrasonic waves includes a two-dimensional array of transducers, and a controller (not shown) for causing the individual oscillators to oscillate independently. By phase control like that in the embodiment shown in FIG. 12, the ultrasonic waves can be brought into a focus, and a cell can be trapped at the position of this focal point. This ultrasonic wave oscillator unit is moved by a three-dimensional manipulation unit 35 to thereby move the position of the focal point. The ultrasonic wave oscillator unit can also finely move the position of the focal point by varying the phases of the ultrasonic wave oscillators. By using a pair of ultrasonic wave oscillator units, the cells to be fused in a cell fusion are guided to an object position. With the apparatus according to this embodiment, a cell of a particle radius of 30 $\mu$m can be trapped and moved by ultrasonic waves of 3 MHz.

The portion for inducing a cell fusion by the focusing ultrasonic waves is formed by a two-dimensional array of ultrasonic wave oscillators 43 which generate ultrasonic waves of 100 MHz. After the cell fusion inducing portion is moved to an object position by the micro-manipulator 35, a focal point can be formed at the object position by the method same as that in the embodiment in FIG. 11. After cells 38 to be fused together are placed in a position and set in contact with each other, by sending ultrasonic waves in pulses, the cells can be fused.

To suppress the effect of cavitation, the dissolved gas in the solution in the cell 36 may be replaced by a triatomic gas of carbon dioxide, nitrous oxide, or the like.

Though not shown in a diagram, to trap two cells, an ultrasonic apparatus of the type shown in FIG. 3A may be used. If this ultrasonic apparatus is used, by controlling the ultrasonic wave oscillators so as to bring the focal point to each cell and moving the position of the focal point, the two cells can be collected to one position.

Further, by collecting cells to be fused together to the center of the circle, and sending pulse-shaped ultrasonic waves of a frequency of 100 MHz simultaneously from the oscillators to the cells, which are kept in contact with each other, the cells can be fused. Instead of using ultrasonic waves, other methods such as applying an electric field or adding a cell fusion accelerator may be used.

To suppress the effect cavitation, the dissolved gas in the solution in the cell 36 may be replaced by a triatomic gas of carbon dioxide, nitrous oxide, or the like.

By the embodiments shown in FIGS. 4 to 12, unlike with the conventional methods, such as tweezers, electric field, laser beam, or the like, it has become possible to use a method of using ultrasonic waves to generate a gradient force field by which to trap and transport a particle. Therefore, it is possible to trap and transport substances that could not be trapped heretofore, such as substances that cannot be held with tweezers non-destructively, electrically neutral substances, optically active substances, and substances in a solution of high turbidity. Moreover, by arranging ultrasonic oscillators and generating ultrasonic waves of optional intensities and phases, it has become possible to generate a gradient force field easily. Accordingly, by a simple apparatus in contrast to apparatus for moved conventional optical trapping, it has become possible to trap and transport a particle to a region of an optional shape. In addition, since, at the focal point of ultrasonic waves, a particle is acted on by attraction to or repulsion from the focal point depending on its physical properties, it has become possible to selectively trap a particle, which was impossible in conventional optical trapping or the like.

Furthermore, since it is possible to selectively trap particles in non-contact manner without causing damage by contact or optical damage to the cells, and fuse them together, a premeditated cell fusion can be performed with high probability.

[Embodiments of Concentrator]

The most universal and simplest method of concentrating the particles in a liquid and extracting them is to separate particles by giving an external force. When a centrifugal force is used as the external force, in order to obtain a sufficient centrifugal force, it is necessary to fill the container with a liquid and rotate the container at several tens of thousands of revolutions per minute. It is difficult to continuously concentrate particles in a large quantity of solution by simple means, or mount a concentration unit in an analysis device.

The prevailing method of removing impurity particles from the solution is to use a membrane filter. But, owing to its nature, the membrane filter deteriorates in function with the quantity of solution treated. The membrane filter is decomposed by some kinds of solution, and if this happens, the filter cannot be used. Another problem with the membrane filter is that it is impossible to arbitrarily vary the size of particles it filtrates, so that the size of particles that can be filtrated is determined by the size of pores of the filter on hand.

The above problem is solved by exerting a radiation force of ultrasonic waves according to this embodiment on the particle. More specifically, it is required to generate plane stationary waves or plane progressive waves of ultrasonic waves in the fluid, and have a resulting gradient force field exert an external force on the particle in a non-contact manner.

To be more concrete, it is required, while a fluid containing metal particles, protein particles, or the like, which are to be converged, are made to migrate in a tube or in a gel, to form the plane stationary waves or plane progressive waves of acoustic waves or spiral acoustic waves in concentric circles in a direction perpendicular to the direction of the migration, and form a region where the particles are concentrated and a region where the particles are absent in the fluid by collecting the particles to a node or a loop of the plane stationary waves or collecting the particles in the progressing direction of the plane progressive waves or in the direction opposite to the above-mentioned progressing direction, or confining the particles to the acoustic field in concentric circles and decreasing this concentric circle according to differences in density and sound velocity between the particles and the fluid.

Or, it is required to concentrate or filtrate the particles in the fluid by using the force potential wall formed by ultrasonic waves sent out from the sound source in a container filled with a fluid, and utilizing the fact that the fluid can easily pass through this wall but it is difficult for the particles to cross this wall because they receives resistance from the wall. At this time, it is necessary to vary the concentration efficiency or the filtering efficiency by suitably adjusting the intensity of the ultrasonic waves.

The sound velocity vector $\vec{v}(x)$ and the pressure (x) at the position x in the propagation medium of acoustic waves, by using the velocity potential $\phi$, can be expressed as follows.

$$\vec{v}(x) = -\nabla\phi \tag{5}$$

$$p(x) = \rho(d\phi/dt) \tag{6}$$

where $\rho$ is the density of the medium.

If the angular velocity of the acoustic wave is denoted by $\omega$ and the wave number is denoted by k, $$\Phi = \psi \, \text{Exp}[j\omega t] \tag{7}$$

$$V = (\rho(k^2)/4)|\psi|^2 \tag{8}$$

$$T = (\rho/4)|\partial\psi/\partial z|^2 \tag{9}$$

Accordingly, the external force <F> applied to a particle is:

$$<F(z)> = A(\partial V/\partial z) + B((\partial V/\partial z) + 3(\partial T/\partial z)) + \Delta \tag{10}$$

where A, B, and $\Delta$ are constants determined by the particle radius, sound velocity and density of the particle. The $\Delta$ is a term that can be disregarded other than when T and V are substantially or completely fixed.

(In the case of plane stationary waves)

When a particle exists at a position which is a distance h from the position of a node in the plane stationary waves, $$\psi = C \times (\text{Exp}[jk(z+h)] + \text{Exp}[-jk(z+h)]) \tag{11}$$

Therefore, $$T = (|C|^2) \times (\rho k^2)(\sin[k(z+h)])^2 \tag{12}$$

$$V = (|C|^2) \times (\rho k^2)(\cos[k(z+h)])^2 \tag{13}$$

The external force <F> applied to the particle can be given as follows.

$$<F> = (|C|^2) \times [(-A+2B)(\rho k^2)]\sin(2\,kh) \tag{14}$$

The acoustic wave intensity I can be expressed as:

$$I = (|C|^2) \times (\rho c(k^2))/2 \tag{15}$$

$$(-A+2B) = (4\pi(a^3)k)[-1/3\lambda(\sigma^2)) + (\lambda+(2/3)(\lambda-1)/(1+2\lambda)] = f(\lambda, \sigma) \tag{16}$$

$$\lambda \equiv \rho^*/\rho, \; \sigma \equiv c^*/c = k/k^*$$

The $\rho^*$, $c^*$ and $k^*$ are the density, sound velocity, and wave number in the particle. The $\rho$, c and k are the density, sound velocity, and wave number in the medium. Therefore, when the function of the density and the sound velocity of a particle is $f(\lambda, \sigma) > 0$, the particle is acted on by a force in the direction of the loop of the acoustic pressure, and when $f(\lambda, \sigma) < 0$, the particle is acted on by a force in the direction of the node of the acoustic pressure.

(In the case of plane progressive waves)

When there is a particle at the origin in the plane progressive waves, the following relationship holds.

$$\psi = C \times \text{Exp}[jkz] \tag{17}$$

Therefore, $$T = (|C|^2) \times \rho/4 \tag{18}$$

$$V = (|C|^2) \times \rho(K^2)/4 \tag{19}$$

Then, $$(\partial V/\partial z) = 0 \tag{20}$$

$$(\partial T/\partial z) = 0 \tag{21}$$

Therefore, $$<F> = \Delta = 2\pi\rho(ka)^6)f(\lambda, \sigma) = 4\pi(a^2)((ka)^4)(I/c)f \tag{22}$$

The function f can be expressed as:

$$f = f(\lambda, \sigma) = (1/(1+2\lambda)^2)[(\lambda - (1+2\lambda)/(3\lambda\sigma^2))^2 + (2/9)(1-\lambda)^2] \tag{23}$$

Therefore, when the function f of the density and sound velocity of a particle is $f(\lambda, \sigma) > 0$, the particle is acted on by a force in the progressing direction of the acoustic wave, and when $f(\lambda, \sigma) < 0$, the particle is acted on by a force in the direction opposite to the progressing direction of the acoustic wave.

(In the case of the progressive waves by a sound source of a limited magnitude)

When the radius R of the sound source of a limited magnitude is kR>>1, $$V = T = I/(2c) \tag{24}$$

Therefore, $$<F> = ((A+4B)/(2c))(\partial I/\partial z) = f(\partial I/\partial z) \tag{25}$$

When $f = f(\lambda, \sigma) > 0$, the particle tends to move in the direction of greater I, but when $f(\lambda, \sigma) < 0$, the particle tends to move in the direction of smaller I.

(Relation between radiation force and concentration gradient)

The chemical energy $\mu$ of a solution containing particles, if a force applied to 1 mol of particulate matter by the radiation force of the ultrasonic waves is denoted by [F], can be given by the following equation.

$$\mu = \mu 0(T) + \mu c - [F]dz \tag{26}$$

In the condition that the concentration distribution of particles in the solution has reached equilibrium, we have $$d\mu/dz = 0 \tag{27}$$

In this case, the chemical potential $\mu c$ of particle meets the following equation.

$$d\mu c/dz = [F] \tag{28}$$

Integrating both sides with respect to z, $$(d\mu c/dz)dz = (\mu c2) - (\mu c1) = RT \ln(c2/c1) = \int [F]dz \quad (29)$$

Therefore, the gradient of concentration that occurs between the coordinate z1 of the particle concentration C1 and the coordinate z2 of the particle concentration C2 is given as:

$$C2/C1 = \text{Exp}[(\int [F]dz)/(RT)] \quad (30)$$

where R is a gas constant.

(Concentration and filtration of particles)

On the basis of the principle described above, the gradient of concentration could be generated which is due to the external force exerted on the particles in the fluid, said external force being generated by the radia- tion force of ultrasonic waves. By having the intensity of the radiation force of ultrasonic waves distributed in a spatial distribution, a gradient force field is generated in the space of the fluid as a wall against the diffusion of the particles. This wall prevents the diffusion or entry of particles, the particles were concentrated within the wall, and only a fluid outside the wall, which does not contain the particles could be extracted selectively.

EXAMPLE

To take an example, in the case of a particle of a specific gravity of 2.7 and a particle diameter of 100 $\mu$m, when the plane stationary waves of 10 MHz and 100 W/m$^2$ are applied, f=0.00316 (>0). Therefore, the particle is attracted to the position of the loop of the acoustic pressure, and an external force which acts on the particle at the position of the nose is about 21 dyn.

The construction of the apparatus will be described in detail.

Figure 13A:
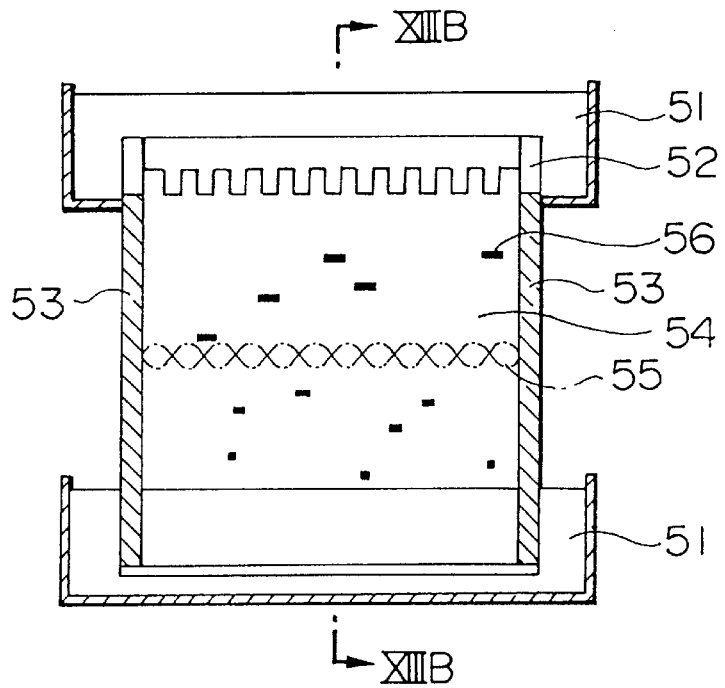
FIG. 13A is a sectional view taken in the direction of the arrows along the line XIIIA—XIIIA of FIG. 13B and showing the concentrator of the first embodiment used in the first and second basic arrangements shown in FIGS. 2A and 3A.
Figure 13B:
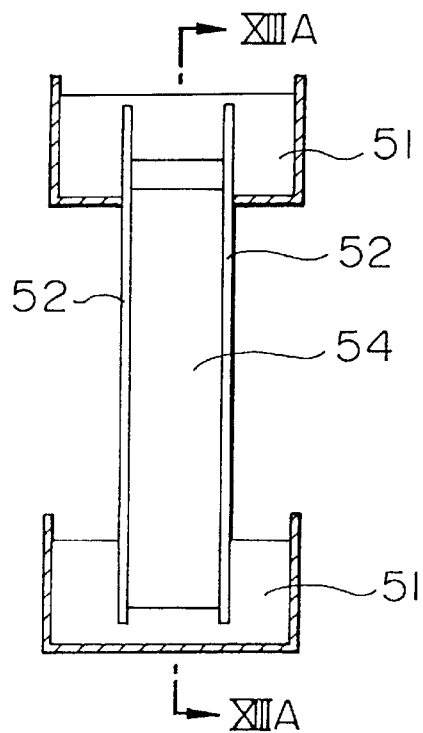
FIG. 13B is a sectional view taken in the direction of the arrows along the line XIIIB—XIIIB of FIG. 13A and showing the concentrator of the first embodiment.

FIGS. 13A and 13B are respectively a construction diagram, as seen from the front, and a construction diagram, as seen from the side, of an embodiment of the concentrator. FIG. 13A is a sectional view taken in the direction of the arrows along the line XIIIA—XIIIA of FIG. 13B. FIG. 13B is a sectional view taken in the direction of the arrows along the line XIIIB—XIIIB of FIG. 13A. This apparatus includes a section where gel-electrophoresis is performed, and an ultrasonic wave generator section where the plane stationary waves are generated in a gel, and therefore, while separating a sample by electrophoresis, simultaneously concentrates the separated sample by the ultrasonic waves. In the electrophoresis section, agarose gel 54 is placed between glass panes 52. The upper and lower end portions of the gel are immersed in water tanks 51 filled with a migration solution, which is a mixed solution of a migration agent (glycine, or the like), a buffer solution (trizma-base, or the like), and a surface-active agent (SDS). The sample 56 in the gel is caused to electrophorese by applying a potential difference between the two tanks.

At the opposite sides of the gel (at the edges on the opposite sides of the glass panes 52), ultrasonic wave oscillators 53 are placed facing each other, and by varying the frequency to suit the intervals of lanes of the sample, which is to be made to electrophorese, the position of the node or the loop of the plane stationary waves can be brought to the center of the lanes. This has the same effect as substantially setting a wall for providing the gel with the lanes. Furthermore, by adjusting the intensity, it is possible to apply a minimum necessary acoustic pressure for concentrating the sample according to the kind of sample and the electrophoresis velocity. The sound velocity in the gel is almost the same as that in the solution, namely, 1500 m/s. Therefore, by using the plane stationary waves of 200 kHz, electrophoresis lanes at 15-mm intervals can be formed.

The samples in the plane stationary waves can be divided into those which are concentrated at the position of the node and those which are concentrated at the position of the loop of the plane stationary waves according to the sound velocity and the density of the sample components relative to those of the solvent. If a detector, such as a fluorescence detector and a light scattering detector, is installed at a position close to the lower end of the gel 54, a trace amount of protein can be detected. Also, by producing a laminar flow at the lower end of the gel 54 and using a capillary tube, the concentrated sample that has come out of the gel can be extracted.

Though this embodiment is formed based on SDS electrophoresis using agarose gel, polyacrylamide can be used as the gel, or other types of electrophoresis, such as isoelectric focusing, can be used. This embodiment has been described using a slab gel, but a disc gel, a capillary gel, or the like can be used.

By transmitting ultrasonic waves into the gel to oscillate the pores of the gel, the molecular weight of giant protein, a giant DNA chain, etc. can be measured accurately. In the past, the precise measurement of those substances was difficult.

Figure 14:
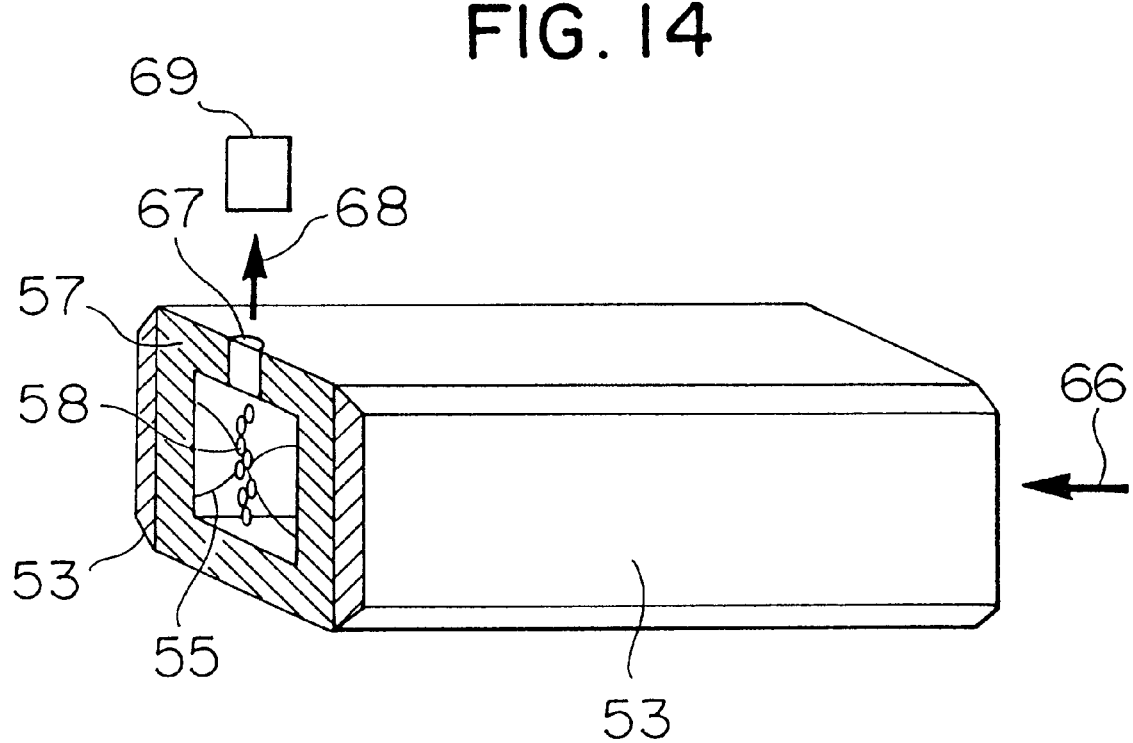
FIG. 14 is a construction diagram showing the concentrator of the second embodiment used in the first basic arrangement shown in FIG. 2A.

FIG. 14 is a construction diagram of a second embodiment of the concentrator. This apparatus includes a tube 57 for conducting a fluid, and ultrasonic wave oscillators 53, provided at opposite sides on the outer walls of the tube 57, for generating the plane stationary waves 55 in the fluid in the tube 57, and therefore, the solute, such as particles 58, in the fluid inside the tube can be collected in the center of the tube by ultrasonic waves. When the fluid is water, the sound velocity in the water is 1500 m/s. Therefore, when the frequency of the ultrasonic waves generated by the ultrasonic wave oscillators 53 is 1 MHz, the wavelength $\lambda$ is 1.5 mm, and if the width of the tube is $\lambda/2$ or integral multiples of $\lambda/2$, the particles gradually gather at the node or the loop of the plane stationary waves in the tube while dividing into the particles which gather at the node and the particles which gather at the loop of the plane stationary waves in compliance with the relation of the sound velocity and the density of the particles. The thickness of the inside wall of the tube 57 is preferably $\lambda/2$, and if the material of the tube is quartz glass, the sound velocity is 5400 m/s, so that the tube wall thickness when ultrasonic waves of 1 MHz are used is 2.7 mm. The fluid in the tube may be either stationary or flowing. To collect particles in a flowing solution, the only thing to be done is to adjust the intensity of the ultrasonic waves, the length of the tube, or the flow speed according to the size of particles to be collected.

In this embodiment, a tube of a rectangular cross section is used, but tubes of other shapes, including a polygonal tube, may be used if ultrasonic wave oscillators are so arranged on the tube walls as to generate the plane stationary waves in compliance with the shape of the tube. Also, the particles can be observed with a particle detector, such as a fluorescence detector, and on the downstream side of the tube, the concentrated portion of the solution can be taken out of the tube through a capillary tube.

More specifically, in the case of the particle detector, irradiation light 66 incident along the inner walls of the tube strikes a particle 58, and a scattered light 68 coming out of a detection window 67 can be observed by a photodetector 69. Therefore, by fitting an observation window at the position of the node or the loop of the plane stationary waves of the acoustic pressure, the particles in the fluid can be observed effectively.

Figure 15A:
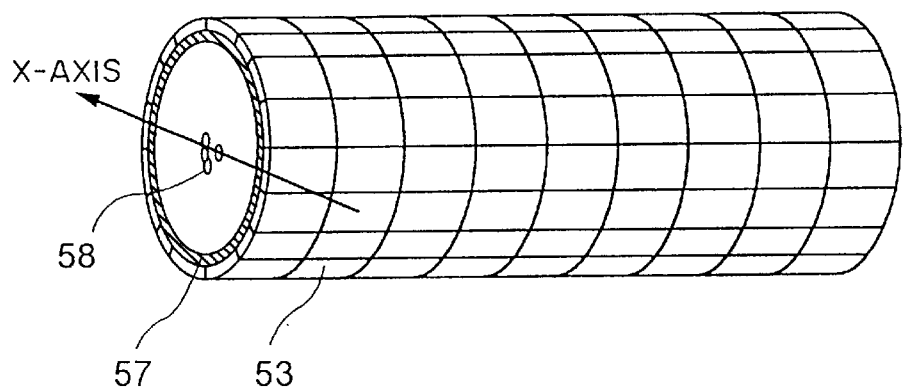
FIG. 15A is a construction diagram showing the concentrator of the third embodiment used in the second basic arrangement shown in FIG. 3A.
Figure 15B:
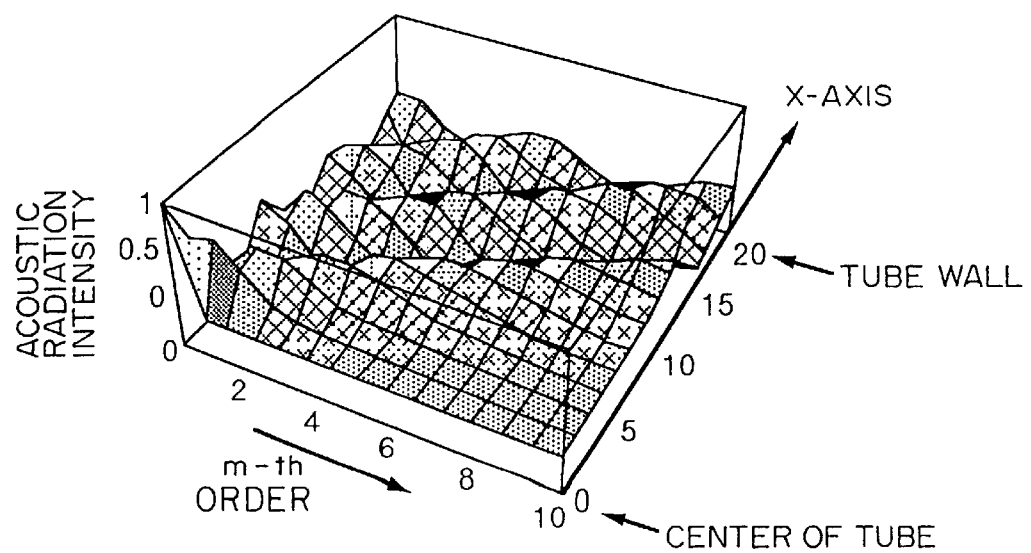
FIG. 15B is an explanatory diagram showing the distribution of intensities of ultrasonic waves by the concentrator shown in FIG. 15A.

FIG. 15A is a construction diagram of a third embodiment of the concentrator. This apparatus includes a tube 57 for transferring a fluid, and a plurality of ultrasonic wave oscillators 53 of the same type for generating ultrasonic waves having intensity distribution as shown in FIG. 15B, and can collect the solute, such as particles 58 or the like in the fluid in the tube at the center of the tube. In FIGS. 15A and 15B, the X-axis is set in parallel with a plane in which the tube is cut in the longitudinal direction. In the plurality of ultrasonic wave oscillators 53 of the same type arranged along the external circumference of the cylindrical tube wall 57, if N pieces of the ultrasonic wave oscillators arranged along the circumference are numbered 1 to N clockwise, the ultrasonic waves generated by the respective ultrasonic wave oscillators are expressed by equation (31) in the same manner as in equations (3) and (4).

$$A(i)=A_0(i)\cdot\mathrm{Exp}[j(\omega t+\delta(i))] \quad (31)$$

$$\delta(i)= \vec{k}(i)\cdot \vec{r} +2\pi m\cdot(i/N)$$

When ultrasonic waves as shown above are generated, an acoustic pressure distribution of the m-th order Bessel function type occurs in the X-axis direction in the tube according to the order of m, so that field patterns of acoustic pressure as shown in FIG. 15B is obtained. To gradually concentrate the particles in the tube, by gradually changing from a higher state to a lower state of the m-th order or even when the m-th order remains the same, by increasing the frequency of the ultrasonic oscillators, the particles in the tube can be gradually collected to the center of the tube. The fluid in the tube may be either stationary or flowing. To collect the particles in a flowing solution, it is only necessary to adjust the intensity of the ultrasonic waves, the length of the tube, or the flow velocity according to the size of the particles to be collected.

In this embodiment, a tube with a circular cross section is used, but by suitably adjusting the offset $\delta(i)$ of the ultrasonic wave oscillators in compliance with the shape of the tube, tubes of other shapes, such as a polygonal tube, may be used. On the downstream side of the tube, the particles can be observed with a particle detector, such as a fluorescence detector, and the concentrated portion of the solution can be taken out of the tube through a capillary tube.

Figure 16A:
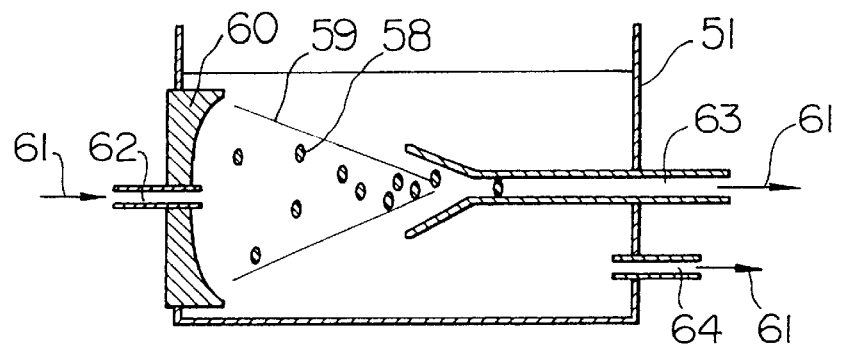
FIG. 16A is a construction diagram showing the concentrator of the fourth embodiment used in the second basic arrangement shown in FIG. 3A.
Figure 16B:
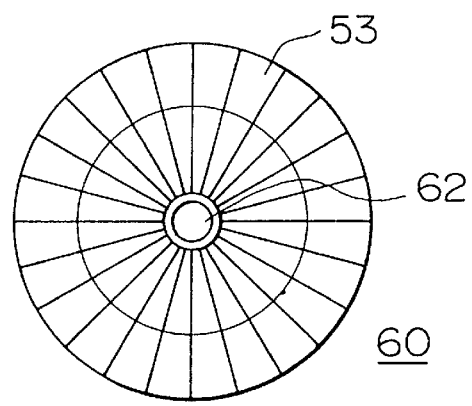
FIG. 16B is a construction diagram as a rear view showing the focusing ultrasonic wave generator of the concentrator shown in FIG. 16A.

FIG. 16A shows a fourth embodiment of the concentrator. This apparatus produces a concentrated solution by concentrating the particles in a solution by using focusing ultrasonic waves, and can also make a clear solution without containing particles. The particles in the solution, which have been caused to enter from a solution inlet port 62 in the direction of the arrow 61 by a conical focusing beam of ultrasonic radiation 59 emitted from a focusing ultrasonic wave generator 60, are trapped in the cone 59, thus allowing only the solvent to go out of the cone. By drawing the solution in the direction of the arrow 61 from the vicinity of the top portion of the cone into a tube 63, a concentrated solution can be obtained from the tube 63. Through another tube 64, a solution without particles can be extracted. The concentration of the solution can be adjusted by adjusting the speed of drawing the solution from the tube 63. As shown in FIG. 16B, which is a rear view of the focusing ultrasonic wave generator, there is the solution inlet port 62 at the center, and N pieces of sectorial ultrasonic wave oscillators 53 are arranged to form the circumferential portion of the ultrasonic wave generator. When ultrasonic waves, which are expressed by equation (31) as in the third embodiment, are generated by the N pieces of oscillators, an acoustic field of the m-th order Bessel function type is generated in the cone 59. By this acoustic field, the particles are trapped in the cone.

Figure 17:
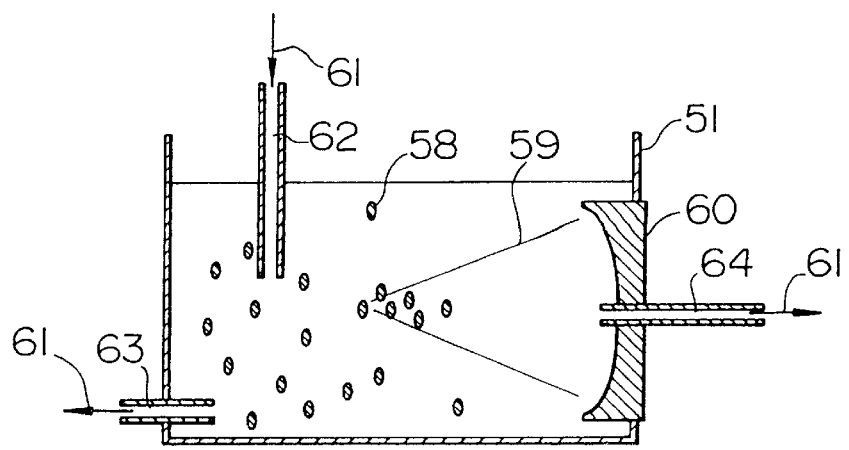
FIG. 17 is a construction diagram showing the concentrator of the fifth embodiment used in the second basic arrangement shown in FIG. 3A.

FIG. 17 shows a fifth embodiment of the concentrator. This apparatus can produce a concentrated solution by concentrating the particles in the solution by the focusing ultrasonic waves, and can also make a clear solution without particles. The particles in the solution, which have been sent from a solution inlet port 62 in the direction of the arrow 61 by a conical focusing beam of ultrasonic radiation 59 from a focusing ultrasonic wave generator 60, are unable to get into a cone 59, but only the solvent can enter the cone. At the outside of the cone of focusing ultrasonic waves, by drawing the solution into a tube 63 in the direction of the arrow 61, a concentrated solution can be obtained from a tube 63, and by examining the solution, the kind of particles (impurities) can be determined. Moreover, a solution without particles can be extracted from a tube 64, the inlet port of which is placed in the cone of the focusing ultrasonic waves. The concentration of the solution can be adjusted by adjusting the speed of drawing the solution. As shown in the rear view of FIG. 16B, the focusing ultrasonic wave generator 60 has a solution inlet port 62 at the center, and also has N pieces of sectorial ultrasonic wave oscillators 53 arranged to form the circumferential portion thereof. When ultrasonic waves, expressed by equation (31) as in the third embodiment, are generated by the N pieces of oscillators, field patterns of acoustic pressure of the m-th order Bessel function type is formed in the cone 59. This acoustic field is used to prevent the particles from entering the cone.

In this embodiment, focusing progressive waves are used to generate a gradient force field formed by ultrasonic waves. However, by forming a wall by the plane stationary waves to prevent the diffusion of the particles that have entered from the solution inlet port or by driving the particles from the sound source to the advancing direction of the progressive waves by the plane progressive waves, divergent progressive waves, or the like, the same effects as in this embodiment can be obtained.

Figure 18:
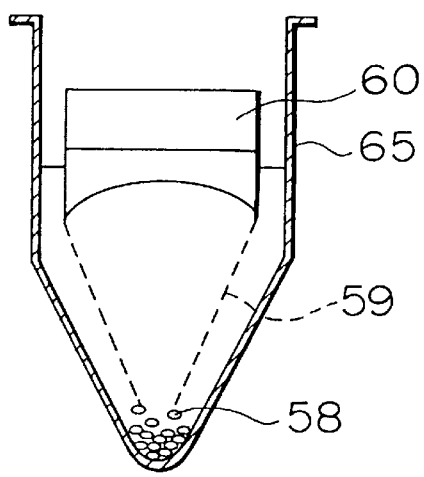
FIG. 18 is a construction diagram showing the concentrator of the sixth embodiment used in the second basic arrangement shown in FIG. 3A.

FIG. 18 shows a sixth embodiment of the concentrator. This apparatus can produce a concentrated solution by concentrating the particles in the solution by using focusing ultrasonic waves, and can also collect the particles at one point by the progressive wave components of the focusing ultrasonic waves. The particles in the tube 65 are subjected to the acoustic pressure in the direction of the top of the conical acoustic field by the conical focusing ultrasonic waves 59 emitted by the focusing ultrasonic wave generator 60, the particles can be collected at the bottom of the tube. As shown in the rear view of FIG. 16B, the focusing ultrasonic wave generator has the solution inlet port 62 at the center, and N pieces of sectorial ultrasonic wave oscillators 53 arranged to form the circumferential portion thereof. When ultrasonic waves, which are expressed by equation (31) as in the third embodiment, are generated by the N pieces of oscillators, the distribution of acoustic pressure of the m-th order Bessel function type is generated in the cone 59. By the acoustic field which advances while converging in the cone, the particles are collected in the direction of the top of the cone.

In this embodiment, the focusing progressive waves are used to generate a gradient force field by ultrasonic waves, which applies the external force to the particles. However, by concentrating the particles in a specific position in the tube by the plane stationary waves or by driving the particles from the sound source to the advancing direction of the progressive waves by the plane progressive waves, divergent progressive waves, or the like, the same effects as in this embodiment can be obtained.

Description will next be made of an embodiment of the concentrator made by giving consideration to means for selectively collecting concentrated particles in a specific range. To be more concrete, this embodiment has been made to provide a concentrator for converging the particles in a fluid into a specific range according to their physical properties by the radiation force of the ultrasonic waves, and selectively collecting object particles from the fluid. Furthermore, in this embodiment, the method of applying the radiation force of the ultrasonic waves for concentrating particles in the fluid is arranged not to depend on the shape of the tube.

The selective collection of particles is achieved by first localizing the particles in a specific range by applying the radiation force of the ultrasonic waves to the particles in a fluid, and then collecting part of the fluid by using a capillary tube, the inside diameter of which is small enough relative to the wavelength of the ultrasonic waves. To be more specific, the particles are acted on in non-contact manner by the external force from gradient force fields generated by the ultrasonic waves in a fluid, then the particles which have gathered in a specified range in the fluid according to their physical properties are drawn by a negative pressure by using a capillary tube on the downstream side of the flow of the fluid. With regard to means for converging the particles, which does not depend on the shape of the tube, the particles are converged by irradiating the particles with the ultrasonic waves in the form of spiral acoustic waves with suitable phase differences by using a plurality of ultrasonic wave oscillators arranged independently around the tube, gradually decreasing the radii of the concentric circles of the spiral acoustic field by increasing the frequency to thereby collect the particles gradually to the center of the concentric circles. In collecting the particles, the external force applied to the particles has only to be varied suitably by varying the intensity of the ultrasonic waves suitably.

To be more concrete, it is required to transfer in the tube a fluid containing metal particles, particles of protein, or the like, which are to be converged, transmit the acoustic waves to be incident in the form of plane stationary waves, or progressive waves of acoustic waves or spiral acoustic waves in concentric circles perpendicularly to the direction of the flow, and form a region where the particles are concentrated and a region where the particles are absent in the fluid by converging the particles to the position of the node or loop of the plane stationary waves according to differences in density and sound velocity between the particles and the fluid or by collecting the particles in the advancing direction of the progressive waves or in the direction opposite to the above-mentioned advancing direction, or by confining the particles to the acoustic field in concentric circles and changing the size of the concentric circles by varying the frequency of the ultrasonic waves. The desired degree of concentration can be achieved by suitably adjusting the flow velocity of the fluid or the intensity of the ultrasonic waves. To collect a fluid containing concentrated particles or collect a fluid without particles, it is required to place a capillary tube at the downstream side of the portion of the tube which is irradiated with the ultrasonic waves, suitably adjust the position of the tip of the capillary tube, and collect part of an object fluid by drawing the fluid by negative pressure through this capillary tube.

Figure 19A:
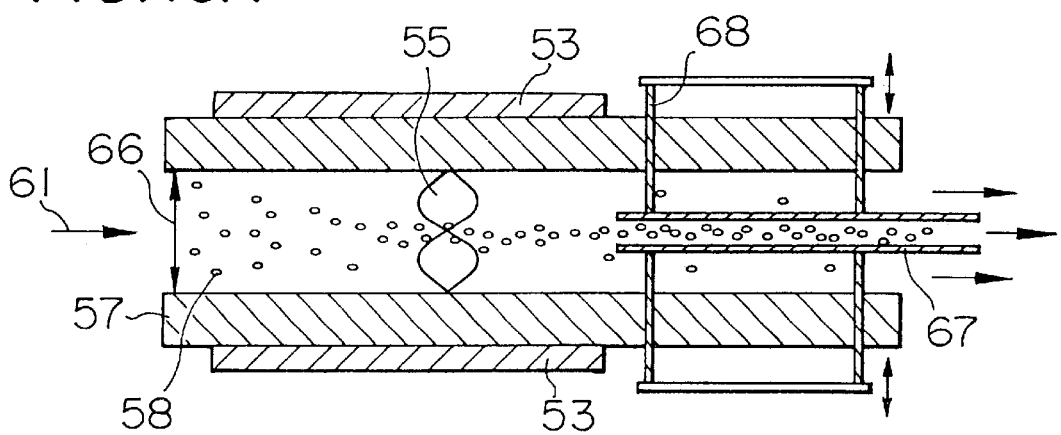
FIG. 19A is a construction diagram showing the concentrator of the seventh embodiment used in the first basic arrangement shown in FIG. 2A.
Figure 19B:
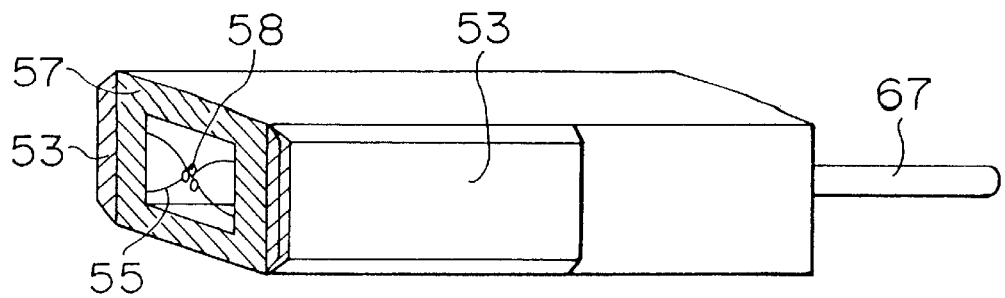
FIG. 19B is a perspective view of the concentrator shown in FIG. 19A.

FIGS. 19A and 19B are respectively a construction diagram in longitudinal section and a schematic construction diagram of the tube of one of the seventh embodiment of the concentrator. This apparatus includes a tube 57 for conducting a fluid and an ultrasonic wave generator section for generating the plane stationary waves 55 in the tube, and can collect the solute, such as particles 58, in the fluid of the tube by using ultrasonic waves. When the fluid is water, the sound velocity in water is 1500 m/s. Therefore, when the frequency of the ultrasonic waves generated by the ultrasonic wave oscillators 53 is 1 MHz, the wavelength $\lambda$ is 1.5 mm, and if the tube width 66 is $\lambda/2$ or integral multiples of $\lambda/2$, the particles gradually gather at the node or the loop of the plane stationary waves in the tube, while dividing into the particles which gather at the node of and the particles which gather at the loop of the plane stationary waves by the relation of the sound velocity and the density of the particles. The inside wall thickness of the tube 57 is preferably $\lambda/2$. When the material of the tube is quartz glass, the sound velocity is 5400 m/s, and therefore, the tube thickness is 2.7 mm when ultrasonic waves of 1 MHz are used. The fluid in the tube may be stationary or flowing. To collect particles in a flowing solution, it is necessary to adjust the intensity of the ultrasonic waves, the tube length, or the flow velocity of the fluid according to the size of the particles to be collected. After the particles in the fluid are concentrated, by moving the capillary tube 67 fixed in the tube 57 with movable fixing rods 68 to an adequate position in the tube 57 and drawing the fluid, a fluid containing the particles converged at the node of or the particles converged at the loop of the plane stationary waves can be drawn selectively, or otherwise, a fluid without particles can be drawn selectively from the capillary tube 67.

Figure 20:
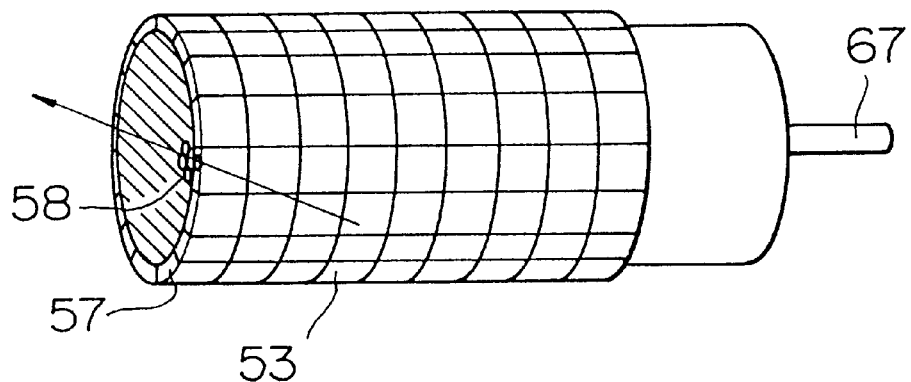
FIG. 20 is a construction diagram showing the concentrator of the eighth embodiment used in the second basic arrangement shown in FIG. 3A.

In this embodiment, a tube with a rectangular cross section is used, but tubes of other shapes, such as a polygonal tube can be used if ultrasonic wave oscillators are arranged on the tube walls so as to generate plane stationary waves in compliance with the shape of the tube. Also, when progressive waves are introduced into the tube, the external force explained in the paragraph on the operation acts on the particles, so that, as in the case where the plane stationary waves are used, the means for converging the particles can be used. FIG. 20 shows another method for focusing the ultrasonic waves. In this method, there are provided a plurality of ultrasonic wave oscillators 53 at the tube wall, which are arranged around the tube wall in the circumferential direction, and when N pieces of the ultrasonic wave oscillators, arranged over the circumference, are numbered 1 to N clockwise, the ultrasonic waves generated by the ultrasonic wave oscillators are made to comply with equation (31).

The thus generated ultrasonic waves can produce the same acoustic state as shown in FIG. 15B. In order to concentrate the particles in this tube, by changing from a higher state to a lower state of the m-th order in the tube or, even if the m-th order remains the same, by increasing the frequency of the ultrasonic wave oscillators, the particles in the tube can be gradually collected to the center of the tube. The fluid in the tube may be stationary or flowing. To collect the particles in a flowing solution, it is necessary to adjust the intensity of the ultrasonic waves, the tube length or the flow velocity according to the size of the particles to be collected.

In FIG. 20, a tube with a circular cross section is used, but tubes of other shapes can be used if the offset $\delta(i)$ of the ultrasonic wave oscillators is adjusted suitably in compliance with the shape of the tube. Therefore, in the same manner as in the embodiment in FIGS. 19A and 19B, by drawing the concentrated particles through a capillary tube 67 from inside the tube on the downstream side of the tube 57, a concentrated solution can be taken out.

The embodiment of this concentrator offers an effect that this apparatus can concentrate or filtrate particles, colloid or the like of metal particles, microorganisms, polymeric beads, protein molecules, DNA chains, high polymers, etc. in a fluid in non-contact manner.

Description will now be made of an embodiment of the concentrator which is useful when the particle size is too small that a force which is produced by ultrasonic waves to act on the particle cannot be applied directly.

The fact that particles adhere to the surfaces of bubbles has been reported in literature or the like. The flotation method is a technique in which the principle that particles adhere to the surfaces of bubbles has been applied. This embodiment is intended to have particles of very small particle sizes as in the flotation method adhere to the surfaces of bubbles, and use the above-mentioned concentrator to handle the particle-adhering bubbles.

Figure 21:
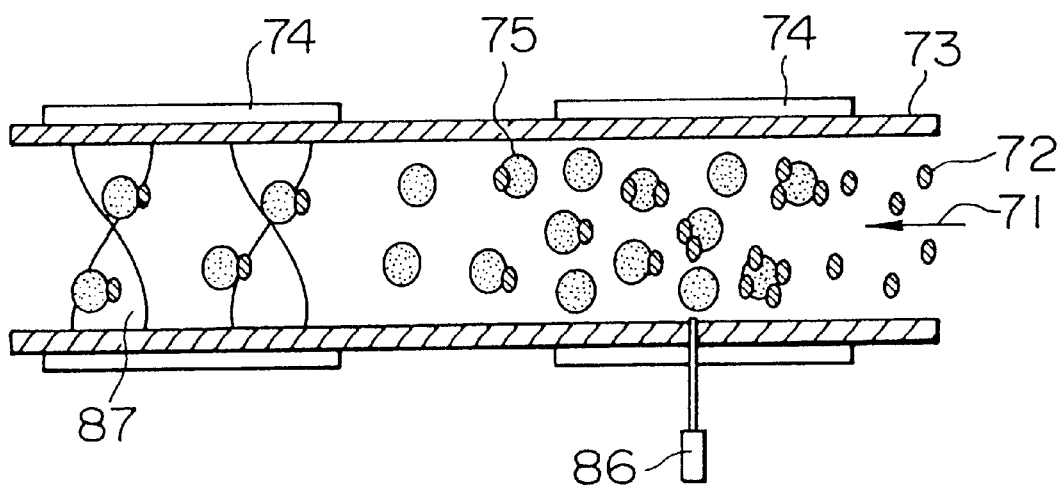
FIG. 21 is a construction diagram showing the basic principle of the impurity eliminator or particle trapping collector used in the first and second basic arrangements.

FIG. 21 is a construction diagram showing the basic principle of the impurity eliminator or the particle trapping collector. The particles 72 flowing in the direction of the arrow 71 in a tube 73 in which a fluid flows advance in an acoustic field generated by ultrasonic wave generators 74 so combined as to generate the plane stationary waves 87 in the tube. Since the radiation force of the ultrasonic waves decreases in proportion to the cube of the particle size, it is difficult to directly trap a particle, the diameter of which is less than 1 $\mu$m, by the radiation force of the ultrasonic waves. Accordingly, by introducing bubbles into a fluid to have particles adhere to their surfaces, those bubbles are captured by the plane stationary waves. As the means for generating bubbles, there is means for generating bubbles 75, which have particles 72 adhering to their surfaces, by using the particles as cavity cores for bubble generation in addition to means for generating bubbles by feeding air directly into the tube. The produced bubbles are captured stably in the acoustic field of the ultrasonic waves by external force applied in non-contact manner from the radiation force of the plane stationary waves against the flow of the fluid. Especially important, in the case of bubbles, they expand or contract resonant with changes in the acoustic force of the ultrasonic waves, so that they can remain stably in the acoustic field against the flow of the fluid. The external force serving to capture the bubbles including particles change by varying the intensity of the acoustic field generated by the ultrasonic wave generators. The minimum size of the particles required to generate bubbles with the particles serving as cavity cores tends to decrease with increasing intensity of the acoustic field. Therefore, the intensity of the acoustic field is changed according to the minimum size of the particles to be trapped. When taking out the particles trapped, by turning off the ultrasonic wave generators, the external force for trapping the particles disappear instantly, so that the trapped particles can be collected on the downstream side of the tube.

When bubbles are generated by cavitation, a Hydrophone 86 is introduced in an acoustic field for generating cavitation, the proportion of produced frequencies which are integral submultiples of the frequency of the emitted ultrasonic waves is observed, and if this proportion is high, it is understood that bubbles are generated effectively.

Figure 22:
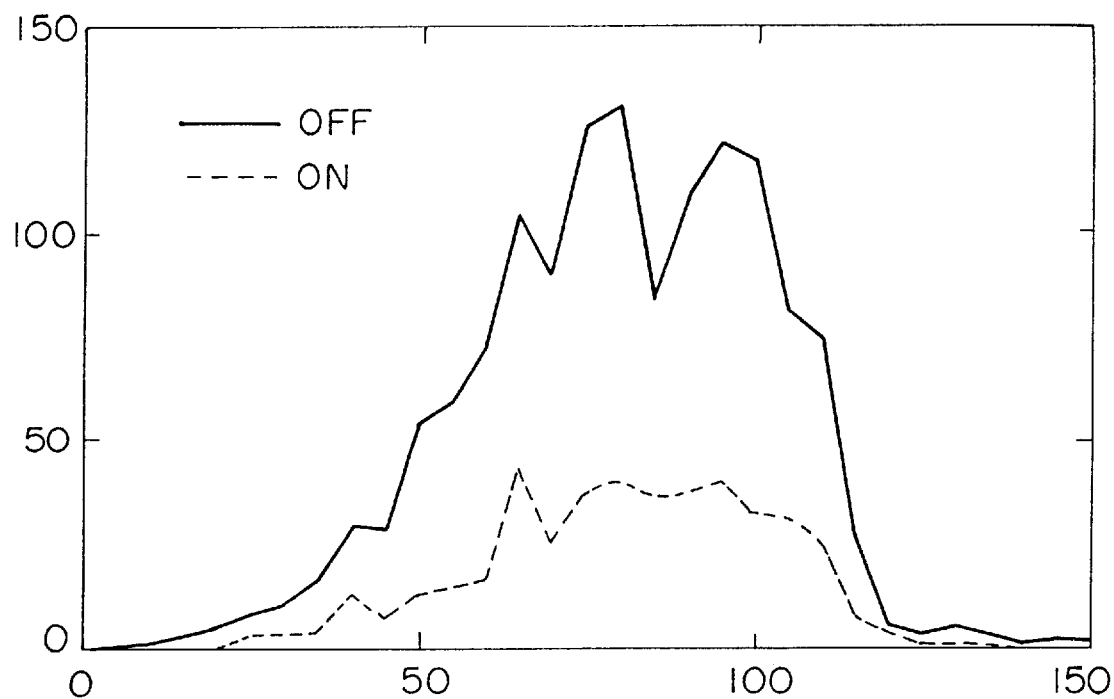
FIG. 22 is a characteristic diagram showing the operation of the impurity eliminator or particle trapping collector.

FIG. 22 shows the results of trapping particles by the apparatus depicted in the construction diagram of FIG. 21. The apparatus is formed with ultrasonic wave generators of PZT ceramics with a resonant frequency of 1 MHz, a quartz glass tube with a wall thickness of 2.78 mm and an internal diameter of 3 mm so that four plane stationary waves are generated in the tube. When particles are sent in an ultra-pure water with a flow velocity of 2.55 cm/s while a 120-V sine-wave alternating voltage of 1 MHz is applied to the ultrasonic wave oscillators, the particles (3538/min) of a particle size and a quantity distribution shown by the solid line decreased to a distribution (874/mi) shown by the broken line.

Figure 23A:
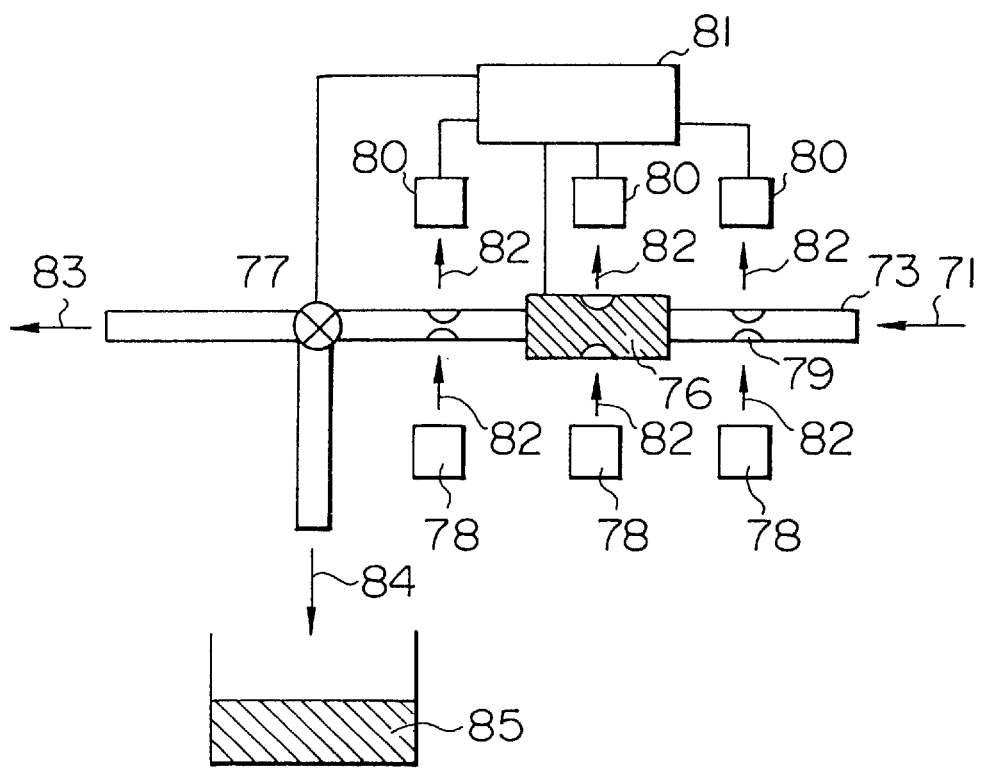
FIG. 23A is a block diagram showing the construction of the impurity eliminator or particle trapping collector used in the first and second basic arrangements.
Figure 23B:
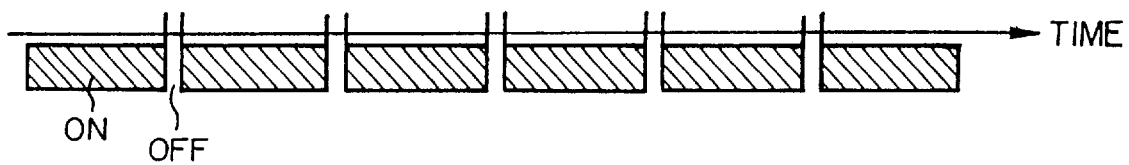
FIG. 23B is a time chart showing the operation of the impurity eliminator or particle trapping collector shown in FIG. 23A.

The basic arrangement of this embodiment will be described with reference to FIG. 23A. This apparatus includes a tube 73 for transporting a fluid, an ultrasonic wave generating and trapping apparatus 76, constructed as shown in FIG. 21, for generating bubbles in the tube and generating the plane stationary waves, a switch valve for switching flow channels, light sources 78 for observing particles in the tube, observation windows 79, observation units 80, and a control unit 81 for controlling the ultrasonic wave generator and the switch valve according to information from the observation units 80. Numeral 82 denotes observation light. The fluid containing impurities 72 flows through the tube 73 in the direction of the arrow 71. An ultrasonic wave generator 76, which has ultrasonic wave oscillators 74 bonded inside the tube, is connected to a certain region in the tube, and when the impurity particles arrive at this region, bubbles 75 are formed with the impurity particles as the cavity cores, and the impurity particles adhere to the surfaces of the bubbles. The bubbles are trapped easily by the plane stationary waves, and stay at the position of the loop of the acoustic pressure. The bubbles with the impurity particles are allowed to flow in the flow direction 71 of the fluid in the tube by stopping the ultrasonic wave oscillators.

Therefore, by changing over the channel from the flow direction 83 to the flow direction 84, the fluid including the bubbles and the particles can be selectively obtained. The units for observing the particles in the fluid are installed at the region of the ultrasonic wave generator, and at the upstream and downstream sides thereof, and according to information from those units, the control unit controls the intensity of the ultrasonic wave generators and also controls the switch valve. After the particles are selectively trapped, samples can be obtained in a tank 85 by using the switch valve. With regard to the timing of ultrasonic wave irradiation, only when the ultrasonic waves are turned on, the fluid is transferred in the direction of the arrow 83, and when the ultrasonic waves are off, the valve 77 is controlled so that the fluid, including the particles, is guided in the direction of the arrow 84, and discharged into the tank 85.

In this embodiment, the ultrasonic wave oscillators made of PZT ceramics with a resonant frequency of 1 MHz and a quartz glass tube with a wall thickness of 2.78 mm and an internal diameter of 3 mm were used. Under this arrangement, while a 120-V sine-wave alternating voltage of 1 MHz was applied to the ultrasonic wave oscillators, 0.3-$\mu$m-diameter polystyrene beads in an ultra-pure water flowing at a flow velocity of 2.55 cm/s could be trapped.

In this embodiment, as the bubble generating means, ultrasonic waves were used, but the bubbles can be generated by using a capillary tube to introduce air into the tube. When the bubbles are generated by ultrasonic waves, in FIG. 21, by a pair of opposing ultrasonic wave oscillators 74, acoustic waves of different frequencies may be emitted or ultrasonic waves of a frequency which does not generate plane stationary waves in the tube may be emitted. For example, it is only necessary to generate two frequencies $\omega$ and 2ω from the two ultrasonic wave oscillators so that the inside diameter of the tube is λ/2. Or otherwise, it is only necessary to simultaneously generate frequencies (ω+δω) which are slightly shifted from ω.

Figure 24:
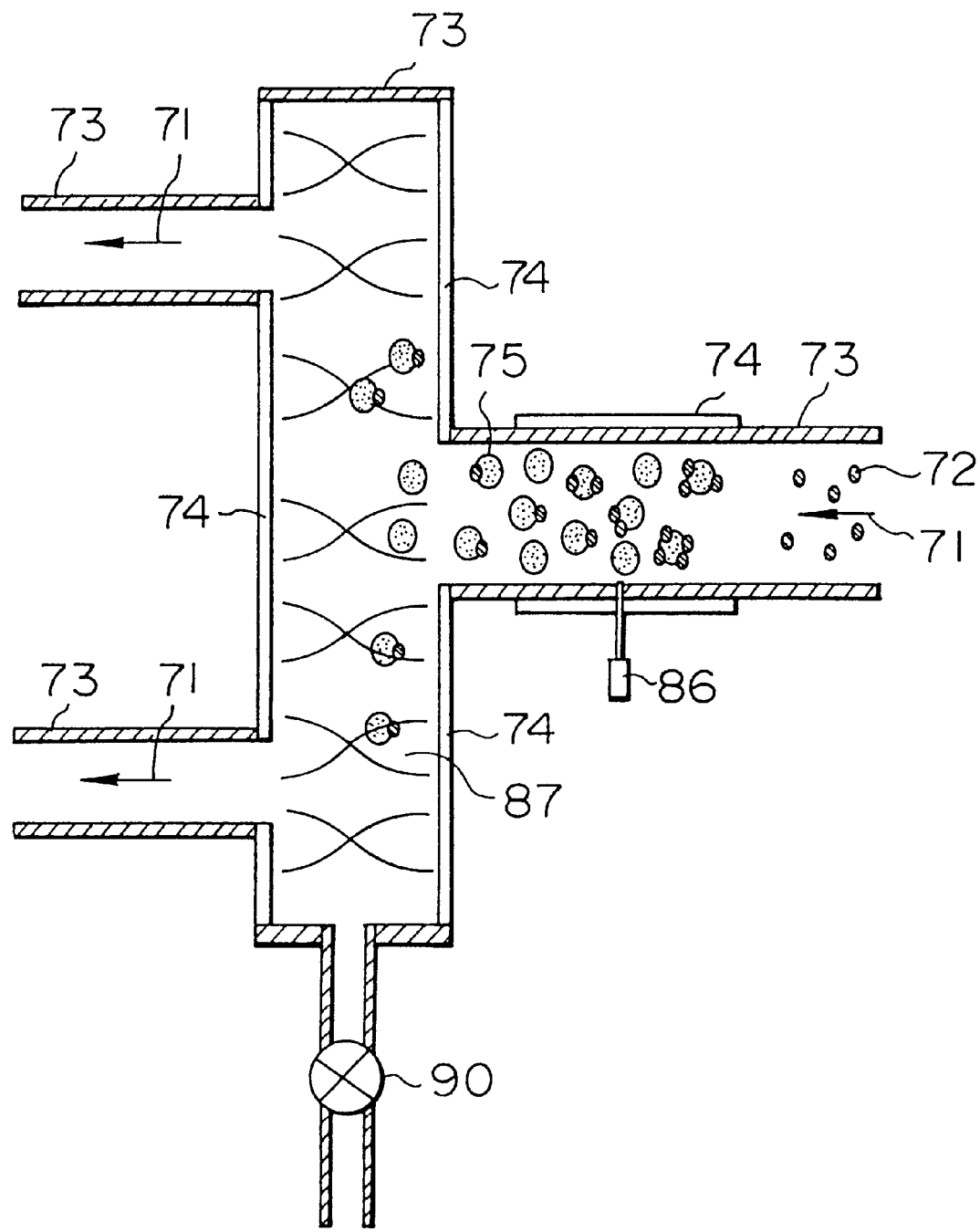
FIG. 24 is a construction diagram showing another example of the impurity eliminator or particle trapping collector.
Figure 25A:
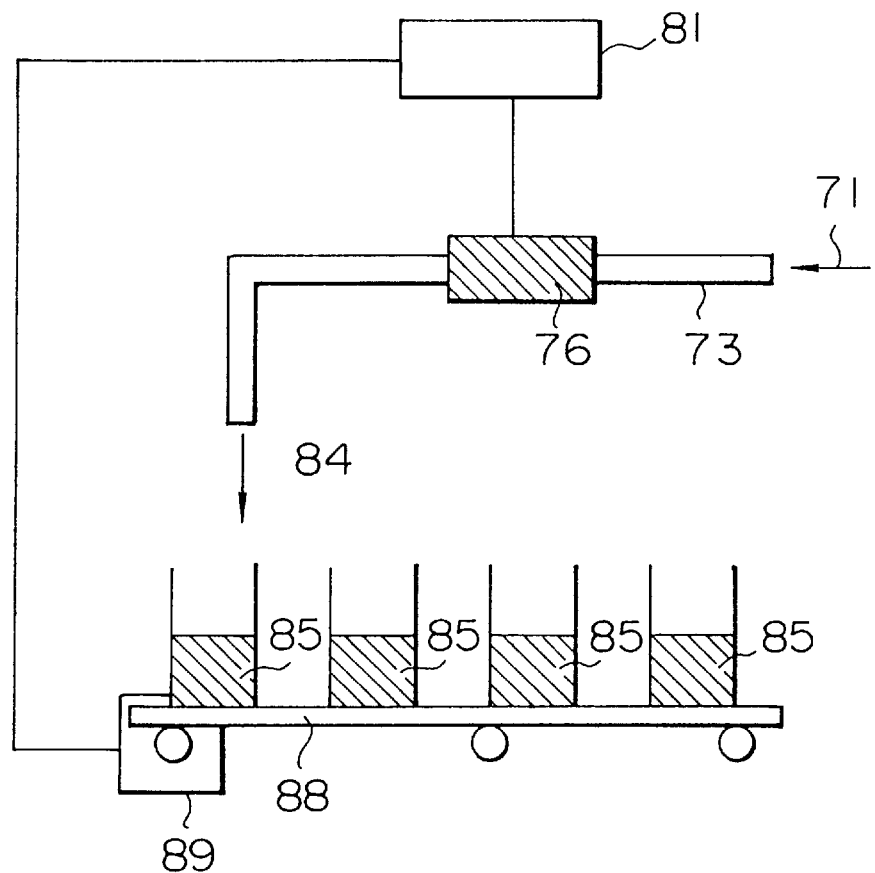
FIG. 25A is a block diagram showing still another example of the impurity eliminator or particle trapping collector.

Furthermore, in this embodiment, particles were trapped by irradiating the ultrasonic waves perpendicularly to the flow direction of the fluid and by generating a place of potential minimum in the acoustic field. However, as shown in FIG. 24, it is also possible to inject the ultrasonic waves in parallel with the direction of the flow to thereby generate the plane stationary waves in the tube, trap the particles in the fluid, and open a valve 90 from time to time to discharge the fluid containing the trapped particles. FIG. 25A shows another construction of the embodiment shown in FIG. 23A. This apparatus includes a tube 73 for transporting a fluid, an ultrasonic wave generating and trapping apparatus 76, constructed as shown in FIGS. 21 and 23A, for generating bubbles in the tube and generating the plane stationary waves, tanks 85 for receiving the fluid, a motor 89 having a carriage 88 for moving a plurality of tanks to the position of a fluid outlet port 84 and means for confirming the amount of travel of the carriage, and a control unit 81 for output control of the ultrasonic wave generators and motion control of the motor. The fluid containing impurities 72 flows in the tube 73 in the direction of the arrow 71. An ultrasonic wave generator 76, which has ultrasonic wave oscillators 74 bonded inside the tube, is connected to a certain region in the tube, and when the impurity particles arrive at this region, bubbles 75 are formed with the impurity particles as the cavity cores, and the impurity particles adhere to the bubbles. The bubbles are trapped easily by the plane stationary waves, and stay at the position of the loop of the acoustic pressure. The bubbles and the impurity particles are allowed to flow in the flow direction 71 of the fluid in the tube by stopping the ultrasonic wave oscillators.

Figure 25B:
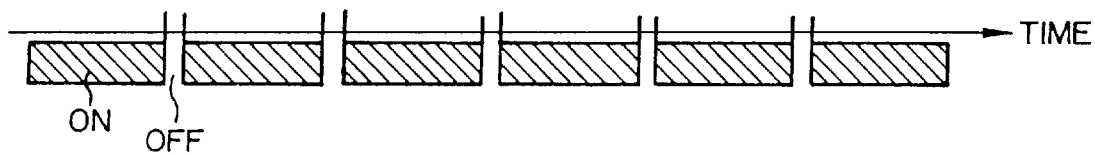
FIG. 25B is a time chart showing the operation of the impurity eliminator or particle trapping collector shown in FIG. 25A.

Therefore, by turning on and off the ultrasonic waves as shown in the time table of FIG. 25B at the downstream side of the flow, in synchronism with the on/off operation the tanks on the fluid discharge section are moved, and the fluid containing the particles is collected selectively.

According to this embodiment, the impurities of a very small particle size are removed in non-contact manner by using bubbles which can be produced and eliminated freely. Therefore, this embodiment makes possible the impurity removal and collection method having a simple and handy filteration function, which lacks in the conventional contact type filter, and can perform a selective impurity removal and collection function.

[Embodiments for Realizing a Diffraction Unit]

Description will then be made of an embodiment of the apparatus for diffracting light beams, microwaves or ultrasonic waves by using means for trapping particles by ultrasonic waves.

Conventional diffraction and scattering of light by ultrasonic waves utilizes the phenomenon that when an ultrasonic wave travels through a medium penetrable to light, the density varies in the medium and the index of refraction of the medium changes. Various studies have been pushed forward into this phenomenon in terms of theory and experiment.

Generally, in the equation of diffraction by a diffraction grating formed by ultrasonic waves, like in the case of an ordinary optical grating, when light is incident perpendicularly to the grating, the diffraction angle of the n-th degree can be expressed as:

$$\sin\theta = n\lambda/\Lambda \tag{32}$$

where θ is the diffraction angle, λ is the light wavelength in the medium, and Λ is the wavelength of the ultrasonic wave. Therefore, in this diffraction grating, the diffraction angle θ can be changed according to changes in the wavelength Λ of the ultrasonic wave. In addition, the diffraction phenomenon itself can be controlled by turning on and off the output of the ultrasonic wave.

The ratio δI of first order diffracted light/0-th order diffracted light of the incident light can be expressed as follows.

$$\delta I = \sin^2\left(1.4\left(\frac{0.6328}{\lambda}\right)L\sqrt{Mi}\right) \tag{33}$$

where λ is the wavelength of light, L is the optical path length in the acoustic field, M is the relative diffraction constant of the medium, and i is the incident acoustic intensity (watt/m$^2$). The value of M is 5.0 for tellurium dioxide (TeO$_2$) used as the ultrasonic grating, and th scattering efficiency is about 60 to 80% (2) when the incident light wavelength λ=0.68 μm, L=1 mm, and 1=1(W/m$^2$). Likewise, for molybdenum lead, M=0.22, and therefore, the scattering efficiency is about 30%. As is understood from equation (33), this efficiency changes greatly with changes in the light wavelength, the optical path length, and the intensity of the ultrasonic wave. Therefore, it is required to construct and use the apparatus after the wavelength of the laser used and the intensity of the ultrasonic wave have been determined. To take other substances, for example, M=1.0 for water, M=0.006 for quartz crystal and M=0.001 for sapphire, so that their scattering efficiency against the incident acoustic radiation intensity is generally not very good. Furthermore, for gases including air, since the change of the index of refraction is less than 1% for a pressure change of about 10 atm, this apparatus has yet to be developed further before being put into practical use.

As for changes in the sound velocity of a fluid relative to changes in pressure, in the case of water at 0° C., the sound velocity is 1403 m/s at 1 atm. and 1410 m/s at 36 atm., so that the change in sound velocity is as small as about 0.5% for this change of pressure. Therefore, it is difficult to have the ultrasonic wave diffracted by the diffraction grating formed by the change of the acoustic pressure.

The conventional diffraction unit using ultrasonic waves utilizes the phenomenon that the index of refraction, the sound velocity, or the like of the fluid change with the pressure applied. Therefore, when a solid crystal or a liquid with a large relative diffraction constant M is used, the conventional apparatus exhibits an effect as a Bragg diffraction grating of about 60% scattering efficiency against beams of light from an argon laser, a helium-neon laser, a YAG laser or the like. However, with short wavelength lasers, such a helium-cadmium laser, the light transmittance is not so good. With long wavelength lasers, such as a carbon dioxide laser, the ultrasonic diffraction grating using germanium as the medium can be used, and its scattering efficiency is very bad. The scattering efficiency is defined as shown in equation (33), and therefore, when the apparatus designed to obtain the best scattering efficiency against a light source with a specific wavelength is used for an optional wavelength, the scattering efficiency deteriorates notably with some wavelengths.

When a gas is used as a medium for ultrasonic waves, it is difficult to obtain sufficient changes of the index of refraction by using the acoustic field of ultrasonic wave, so that the scattering efficiency is a few percent. Furthermore, in the conventional apparatus, the diffracted beam split into three pieces by Doppler effect by the advance of the ultrasonic waves by which the diffraction grating is formed.

This embodiment, while utilizing the feature of the conventional light diffraction grating using ultrasonic waves, exhibits an improved performance, particularly, a scattering efficiency of about 80% or higher, which is about the same level as the diffraction grating of the conventional slit plate, and has its object to provide apparatus, which can be used a diffraction grating for microwaves or ultrasonic waves.

This embodiment effectively utilizes the radiation force of the ultrasonic waves, and gathers the particles which are mixed in the fluid but are conspicuously different in the index of refraction or the sound velocity from the fluid. Or cavitation is caused to occur in the fluid, and the produced bubbles are trapped and gathered in an optional pattern. In order to control radiation force of the ultrasonic waves and gather the particles in an optional pattern, the ultrasonic wave generators are formed by a plurality of ultrasonic wave oscillators which are installed in some combinations and controlled independently, and their respective phases are controlled so that they are set in an intended pattern.

Figure 26A:
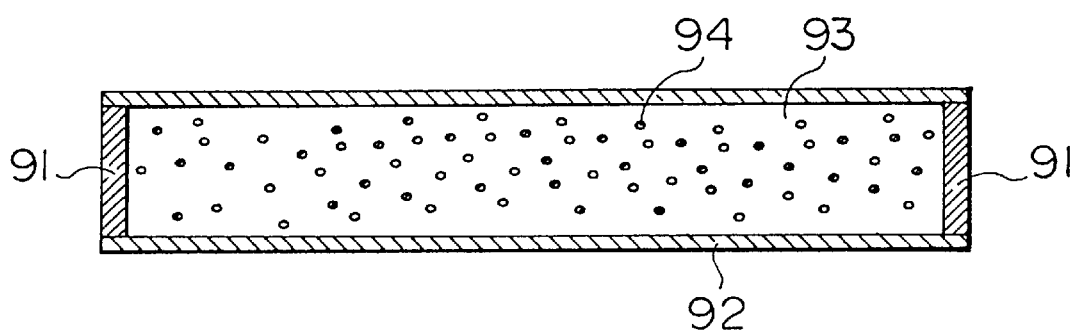
FIGS. 26A and 26B are construction diagrams showing the basic principles of the diffraction units used in the first and second basic arrangements.
Figure 26B:
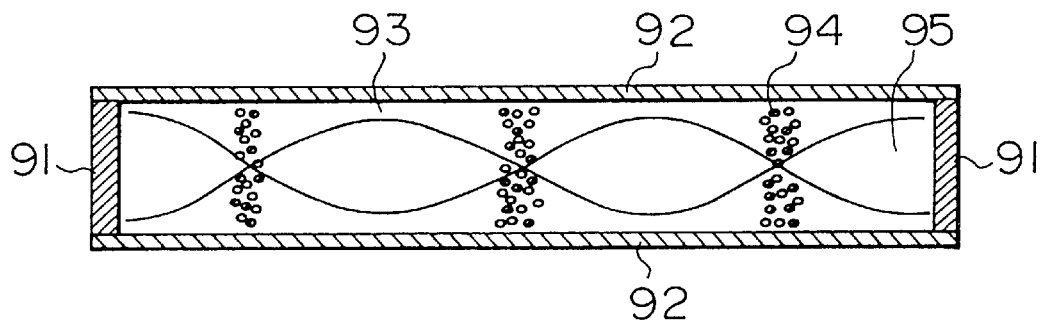

FIGS. 26A and 26B are construction diagrams showing the basic principles of this embodiment. A fluid 93 containing particles 94 is placed between two glass panes 92, and ultrasonic wave oscillators 91 are provided at both ends of the two glass panes so as to generate the plane stationary waves 95. FIG. 26A shows the state when the ultrasonic waves are off that the particles are diffused in the fluid and exhibits no diffraction action at all to the incident light transmitted through the glass panes. FIG. 26B shows the state when the ultrasonic waves are on that the particles, which were diffused uniformly in the fluid, gather at the position of the node or the loop of the plane stationary waves according to differences in the density and the sound velocity between the particles and the fluid.

Whereupon, a diffraction grating is formed in the fluid by the particles arrayed and gathered in the plane stationary waves. In the equation of diffraction by a diffraction grating formed by ultrasonic waves, like in the case of an ordinary optical grating, when light is incident perpendicularly to the grating, the diffraction angle θ of the n-th degree can be expressed as:

$$\sin \theta = n(2\lambda/\Lambda) \qquad (34)$$

The light resolving power in the diffraction grating is $d\theta/d\lambda = (2n/\Lambda)\cos \theta$, and if the total number of the lines of the grating is denoted by N, the resolving power is $\lambda/d\lambda = nN$, far greater than that of a prism. In this case, θ is the diffraction angle, λ is the wavelength of light in the medium, and Λ is the wavelength of the ultrasonic wave. In the diffraction grating, the intervals of the diffracted acoustic pressure by the diffraction grating change with a change of the wavelength Λ of the ultrasonic waves, so that by adequately changing the wavelength of the ultrasonic waves, the diffraction angle θ can be changed. Also, by performing on/off control of the ultrasonic waves, the diffraction grating can be produced and eliminated. Furthermore, the splitting into three pieces of the diffracted beam by the Doppler effect, which occurs when the diffraction grating is formed by the ultrasonic waves could not be observed in the plane stationary waves owing to the inertia of the particles.

Figure 27:
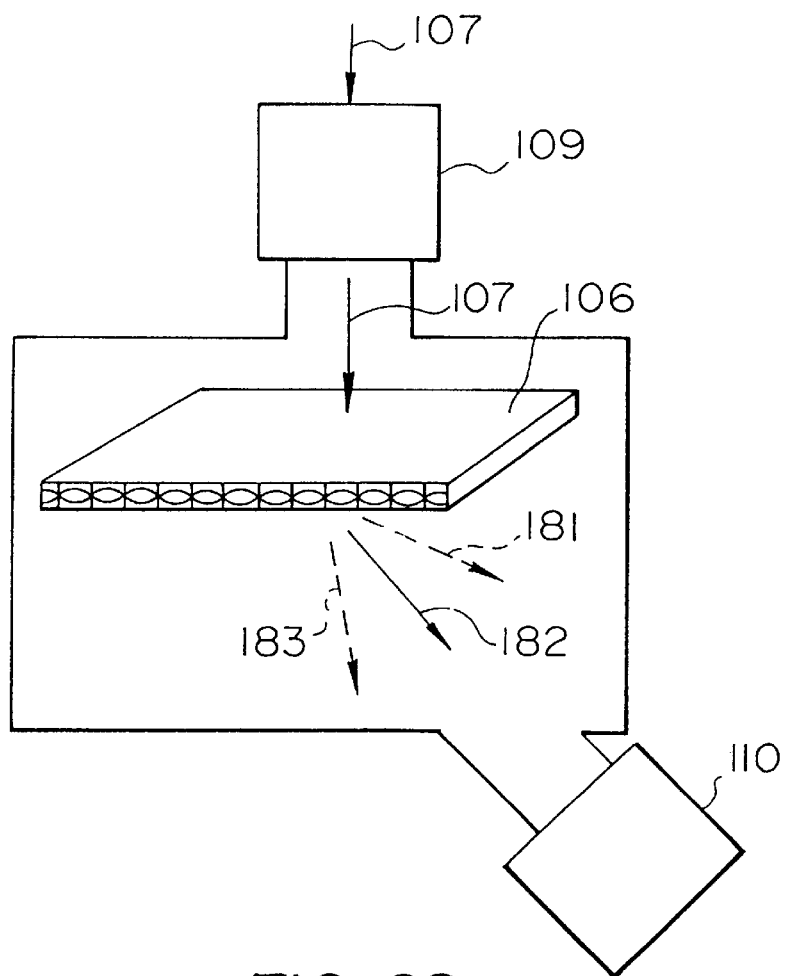
FIG. 27 is a construction diagram showing the diffraction unit used in the first and second basic arrangements.

FIG. 27 is a construction diagram of a concrete example of this embodiment. A light diffraction unit 106 by ultrasonic waves used in this embodiment is constructed as described with reference to FIGS. 26A and 26B, and can be used as a monochromater. The incident light 107, after passing through a collimator 109 and becoming parallel light, is incident on the light diffraction unit 106. The incident light 107 is diffracted by the diffraction grating in the diffraction unit 106. By varying the frequency of the ultrasonic wave oscillators, light of a single wavelength is diffracted in the direction of a diffracted light 181, 182 or 183 in compliance with the relation in equation (33). Therefore, by selecting the frequency of the ultrasonic wave oscillators which can output diffracted light 182 of an object wavelength from white light, the incident light is diffracted. The diffracted light 182 is sent out to the detection unit through a collimator 110.

Figure 28:
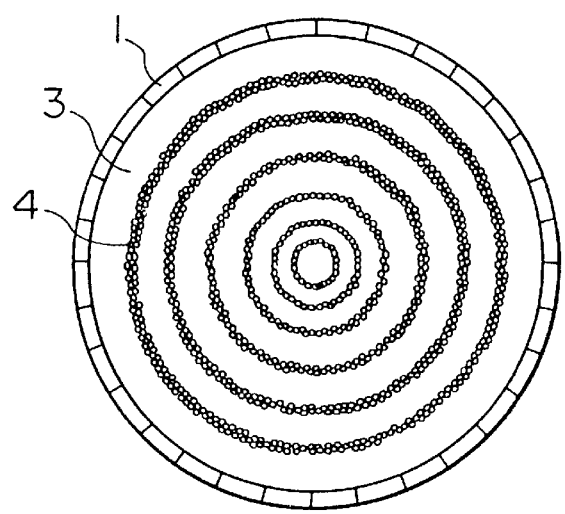
FIG. 28 is a construction diagram showing another example of the diffraction unit used in the first and second basic embodiments.

In this embodiment, by varying the frequency of the ultrasonic wave oscillators, the wavelength of the diffracted light to be supplied to the detection unit can be varied almost continuously without any mechanical manipulation. As shown in FIG. 28, in the diffraction unit comprising a plurality of independent ultrasonic wave oscillators, by sending out ultrasonic waves of different phases from the respective ultrasonic wave oscillators and trapping the particles in the acoustic field of a desired shape generated by superposition of those ultrasonic waves one over another, a holographic grating can also be formed. Therefore, while having monochromatic light fall on the holographic grating, by varying the acoustic field sequentially to thereby change the holographic grating, a holographic image which changes continuously can be produced.

Note that, in this embodiment, transmitted light was diffracted, but this embodiment can also be used for diffraction of reflected light. By obtaining and comparing the ratios of intensities between a 0-th order diffracted light and the incident light or between a first order or higher order diffracted light and the incident light, the quantity of particles existing in the fluid can be estimated. At this time, by continuously introducing the fluid containing particles into this container, and by continuously observing ratios of intensities between the 0-th order diffracted light and the first order or higher order diffracted light, the changes in the quantity of the particles in the fluid can be observed continuously.

In the foregoing description, light was used as waves diffracted by the diffraction unit, but waves, such as microwaves and ultrasonic waves, can also be used if particles which differ in the index of refraction from the fluid are handled in the microwave region or if the particles which differ in sound velocity from the fluid are handled in the ultrasonic wave region. Furthermore, in this embodiment, particles are introduced into the fluid, and they are trapped in a specific position by the ultrasonic waves, but it is also possible to generate bubbles in the fluid by cavitation caused by the ultrasonic waves and trap the bubbles in a specific position by the ultrasonic waves.

This embodiment still makes use of the features of a conventional light diffraction unit using ultrasonic waves, and also provides a diffraction efficiency at a level of the conventional diffraction grating using a slit plate for dealing with light with wavelengths which are impossible to handle in the conventional diffraction unit. Another effect offered by this embodiment is that this embodiment can be used as a diffraction grating for microwaves and ultrasonic waves.

What is claimed is:

1. An apparatus for handling particles comprising:
   a chamber containing fluid in which said particles are distributed,
   a plurality of piezoelectric devices attached to said chamber such that a sub-plurality of said piezoelectric devices are lined up in each of two different directions so as to form a two-dimensional array, and each of said piezoelectric devices being driven independently of each other and irradiating an ultrasound beam in a direction perpendicular to a surface of said two-dimensional array, and an ultrasonic control section, which supplies sinusoidal electric voltages with at least one of different phases simultaneously and different intensities simultaneously to differing said piezoelectric devices, so as to generate a focused ultrasound beam from the plate arrangement of said piezoelectric devices.

2. An apparatus according to claim 1, wherein:

a plurality of two-dimensional arrays are attached to said chamber.

3. An apparatus according to claim 1, wherein:

the shape of at least one said two-dimensional array is a flat plane.

4. An apparatus according to claim 1, wherein:

a plurality of said piezoelectric devices are attached to said chamber with a predetermined interval in both perpendicular directions.

5. An apparatus according to claim 1, wherein:

differing said sinusoidal electric voltages are supplied to said piezoelectric devices over time via a changing of phases and/or amplitudes of said sinusoidal electric voltages.

6. An apparatus according to claim 1, wherein:

the phase difference δ between said sinusoidal electric voltages supplied to any two of said piezoelectric devices is controlled as follows:

$$\delta = 2\pi((R_1 - R_2)/\lambda)$$

where $\lambda$ is the wavelength of ultrasound generated by said piezoelectric devices, $R_1$ is the distance between one of said two piezoelectric devices and said predetermined point, and $R_2$ is the distance between the other piezoelectric device and said predetermined point so that said ultrasound beams focus to said predetermined point.

7. An apparatus according to claim 6, wherein:

phases of said sinusoidal electric voltages are changed so as to transfer focus of said ultrasound beams to said predetermined point according to a progress of time.

8. An apparatus according to claim 1, further comprising:

means for monitoring a distribution of said particles in said chamber, which comprises a material permeable to light, by an optical system.

9. An apparatus according to claim 1, further comprising:

means for extracting a portion of fluid from said chamber.

10. An apparatus according to claim 9, wherein:

said extracting means is a tube arranged to be penetrated to a position next to said two-dimensional array so that said portion of fluid around the surface of said plate is extracted.

11. An apparatus according to claim 1, further comprising:

means for introducing fluid into said chamber, wherein the introducing means is a tube arranged to be penetrated to a position adjoining said two-dimensional array so that said fluid is introduced into the place near the surface of said two-dimensional array.

12. An apparatus for concentrating particles in a fluid, comprising:

a chamber having a rectangular parallelepiped space for containing said fluid in which said particles are distributed, a plurality of piezoelectric devices attached to said chamber such that a sub-plurality of said piezoelectric devices are lined up in each of two different directions so as to form a two-dimensional array, and each of said piezoelectric devices being driven independently of each other and irradiating an ultrasound beam, and an ultrasonic control section which supplies sinusoidal electric voltages with different phases simultaneously to differing said piezoelectric devices.

13. An apparatus according to claim 12, wherein said ultrasonic control section also supplies sinusoidal electric voltages with different intensities simultaneously to differing said piezoelectric devices.

14. An apparatus according to claim 13, wherein said plurality of piezoelectric devices are more specifically attached to said at least one outer face of said chamber parallel to fluid flow in the chamber.

15. An apparatus according to claim 14, wherein:

said fluid can flow continuously through said chamber, and a width of said rectangular parallelepiped space in said chamber is $\lambda/2$ or a multiple of $\lambda/2$, and a thickness of a wall of the face of said chamber is $\lambda/2$ or a multiple of $\lambda/2$, where $\lambda$ is a wavelength of said ultrasound generated by said piezoelectric device.

16. An apparatus according to claim 12, wherein:

said fluid can flow continuously through said chamber, and said plurality of piezoelectric devices are more specifically attached to said at least one outer face of said chamber parallel to a fluid flow in the chamber.

17. An apparatus according to claim 16, wherein:

said plurality of piezoelectric devices are more specifically attached to a set of opposite outer faces of the chamber and parallel to said fluid flow to introduce ultrasound energy into the chamber, and a width of said rectangular parallelepiped space in said chamber is $\lambda/2$ or a multiple of $\lambda/2$, and a thickness of a wall of the face of said chamber is $\lambda/2$ or a multiple of $\lambda/2$, where $\lambda$ is a wavelength of said ultrasound generated by said piezoelectric devices.

18. An apparatus for concentrating particles in a fluid, comprising:

a chamber having a rectangular parallelepiped space for containing said fluid in which said particles are distributed, a plurality of piezoelectric devices attached to said chamber such that a sub-plurality of said piezoelectric devices are lined up in each of two different directions so as to form a two-dimensional array, and each of said piezoelectric devices being driven independently of each other and irradiating an ultrasound beam, and an ultrasonic control section which supplies sinusoidal electric voltages with different intensities simultaneously to differing said piezoelectric devices.

19. An apparatus according to claim 18, wherein:

said chamber more specifically contains a flowing fluid, in which said particles are distributed, and said plurality of piezoelectric devices are more specifically attached to said at least one outer face of said chamber parallel to said fluid flow.

20. An apparatus according to claim 19, wherein:

said plurality of piezoelectric devices are more specifically attached to a set of opposite outer faces of said chamber, and a width of said rectangular parallelepiped space in said chamber is $\lambda/2$ or a multiple of $\lambda/2$, and a thickness of a wall of the face of said chamber is $\lambda/2$ or a multiple of $\lambda/2$, where $\lambda$ is a wavelength of said ultrasound generated by said piezoelectric device.

21. An apparatus for concentrating particles in a fluid, comprising:

a chamber having a rectangular parallelepiped space for containing said fluid in which said particles are distributed, a plurality of piezoelectric devices attached to said chamber such that a sub-plurality of said piezoelectric devices are lined up in each of two different directions so as to form a two-dimensional array, and each of said piezoelectric devices being driven independently of each other and irradiating an ultrasound beam, and an ultrasonic control section, which supplies sinusoidal electric voltages with different phases simultaneously to differing said piezoelectric devices, and which changes said sinusoidal electric voltages according to time, so that the ultrasound irradiated from said piezoelectric devices can form a potential well in said chamber along predetermined two axes, and said particles can be moved by a change of a shape of said force potential well with a progress of time.

22. An apparatus according to claim 21, wherein:

said chamber more specifically contains a flowing liquid in which said particles are distributed, and said plurality of piezoelectric devices are more specifically attached to said at least one outer face of said chamber parallel to said fluid flow.

23. An apparatus according to claim 21, wherein:

said plurality of piezoelectric devices are more specifically attached to the outer face of said chamber two dimensionally.

24. An apparatus for concentrating particles in a fluid, comprising;

a chamber having a rectangular parallelepiped space for containing said fluid in which said particles are distributed, a plurality of piezoelectric devices which are attached to at least one outer face of said chamber in order to introduce ultrasound energy into said chamber, such that a sub-plurality of said piezoelectric devices are lined up in each of two different directions so as to form a two-dimensional array, each of said piezoelectric devices being driven independently of each other, and an ultrasonic control section which supplies sinusoidal electric voltages with different amplitudes to each of said piezoelectric devices, said sinusoidal electric voltages being determined by Fourier analysis for superpositioning of ultrasound irradiated from each of said devices for forming a predetermined potential well, and being changed over time to change said shape of the potential well, so that said particles can be moved by a change of a shape of said potential well with a progress of time.

25. An apparatus according to claim 24, wherein:

said ultrasonic control section also supplies sinusoidal electric voltages with different phases to each of said piezoelectric devices, said sinusoidal electric voltages being determined by Fourier analysis for superpositioning of ultrasound irradiated from each of said devices for forming said predetermined potential well, and being changed over time to change said shape of the potential well so that the change of the shape of said potential well with a progress of the time can move said particles.

26. An apparatus according to claim 25, wherein:

said chamber more specifically contains a flowing fluid in which said particles are distributed, and said plurality of piezoelectric devices are more specifically attached to at least one outer face of said chamber parallel to the fluid flow.

27. An apparatus according to claim 25, wherein:

said plurality of piezoelectric devices are specifically attached to the outer face of said chamber two dimensionally.

28. An apparatus according to claim 24, wherein:

said chamber more specifically contains a flowing fluid in which said particles are distributed, and said plurality of piezoelectric devices are more specifically attached to at least one outer face of said chamber parallel to the fluid flow.

29. An apparatus according to claim 24, wherein:

said plurality of piezoelectric devices are more specifically attached to outer face of said chamber two dimensionally.

30. An apparatus for concentrating particles in a fluid, comprising:

a chamber having a rectangular parallelepiped space for containing said fluid and through which said fluid can flow, and at least one face of said chamber comprising a material which is permeable to light, means for monitoring said particles in said chamber by an optical method, a set of piezoelectric devices being attached to a set of opposite outer faces of said chamber, parallel to said fluid flow, wherein on each said opposite outer face, said piezoelectric devices being arranged in a two-dimensional array having a first sub-plurality of piezoelectric devices substantially aligned in a first direction and a second sub-plurality of piezoelectric devices substantially aligned in a second direction and each said piezoelectric device being driven independently, and wherein a width of said rectangular parallelepiped space in said chamber is $\lambda/2$, and a thickness of the wall of the said chamber is $\lambda/2$ or a multiple of $\lambda/2$, where $\lambda$ is a wavelength of the ultrasound generated by said piezoelectric devices, and an ultrasonic control section, which supplies sinusoidal electric voltages to said piezoelectric devices so that the ultrasound irradiated from said piezoelectric devices can form a standing wave in said chamber and a bottom of a potential well can be formed at a center of said chamber.

31. An apparatus according to claim 30, further comprising:

a means for extracting a portion of fluid from the center of said rectangular parallelepiped space of said chamber, or from the side of said rectangular parallelepiped space of said chamber.

32. An apparatus according to claim 31, further comprising:

means for controlling an extraction place in said chamber by moving a position of a tube in accordance with an observed particle distribution in said chamber using the data obtained from said means for monitoring.

33. An apparatus for handling particles comprising:

a chamber containing fluid in which said particles are distributed, a plurality of piezoelectric devices attached to said chamber such that a sub-plurality of said piezoelectric devices are lined up in each of two different directions on a predetermined surface, and each piezoelectric device faces said predetermined surface so as to form a two-dimensional array of piezoelectric devices upon said predetermined surface, and each of said piezoelectric devices being driven independently of each other and irradiating an ultrasound beam in a direction substantially perpendicular to said predetermined surface of said two-dimensional array, and an ultrasonic control section, which supplies sinusoidal electric voltages with at least one of different phases simultaneously and different intensities simultaneously to differing said piezoelectric devices.

34. An apparatus according to claim 33, wherein said predetermined surface is a substantially flat surface.

35. An apparatus for handling particles comprising:

a chamber containing solution in which said particles are suspended;

a first ultrasonic wave generator being arranged in said solution and being formed by first ultrasonic generating elements arranged in two dimensions in a first flat plane, each of said first ultrasonic generating elements being driven independently of each other;

a second ultrasonic wave generator being arranged in said solution and being formed by second ultrasonic generating elements arranged in two dimensions in a second flat plane which is parallel to said first flat plane, each of said second ultrasonic generating elements being driven independently of each other; and an ultrasonic control section which controls selection of the number and positions of said first and second ultrasonic generating elements, and controls an amplitude and a phase of waveform of each of ultrasonic waves generated by said selected first and second ultrasonic generating elements so as to focus the ultrasonic waves at a predetermined position in said chamber and to move said particles in a direction to a predetermined position at which a minimum point of a force potential is formed by superposition of the gradient force fields by said selected first and second ultrasonic generating elements.

36. An apparatus according to claim 35, wherein each of said first ultrasonic generating elements is mounted on a first flat board and made of transparent material, and each of said second ultrasonic generating elements is mounted on a second flat board and made of transparent material.

37. An apparatus according to claim 35, further comprising a microscope observing said particles in said chamber through said first ultrasonic generating elements, wherein each of said first ultrasonic generating elements is mounted on a first flat board and made of transparent material, and each of said second ultrasonic generating elements in mounted on a second flat board and made of transparent material.

38. An apparatus according to claim 35, wherein a plurality of said minimum points of said force potential are formed one after another sequentially in a plurality of positions in said chamber.

39. An apparatus for handling particles comprising:

a chamber containing fluid, in which said particles are distributed, a plurality of piezoelectric devices attached to said chamber such that a sub-plurality of said piezoelectric devices are lined up in each of two different directions so as to form a two-dimensional array, and each of said piezoelectric devices being driven independently of each other and irradiating an ultrasound beam along a predetermined direction, and an ultrasonic control section, which supplies sinusoidal electric voltages with at least one of different phases simultaneously and different intensities simultaneously to differing said piezoelectric devices.

40. An apparatus for concentrating particles in a fluid, comprising:

a chamber having a rectangular parallelepiped space for containing said fluid in which said particles are distributed, said chamber comprising a material which is permeable to light, a plurality of piezoelectric devices attached to said chamber such that a sub-plurality of said piezoelectric devices are lined up in each of two different directions so as to form a two-dimensional array, and each of said piezoelectric devices being driven independently of each other and irradiating an ultrasound beam into said fluid, an ultrasonic control section which supplies sinusoidal electric voltages with at least one of different phases simultaneously and different intensities simultaneously to differing said piezoelectric devices, means for monitoring a distribution of said particles in said chamber by an optical method, and means for extracting a portion of fluid from said chamber, and means for controlling an extraction place in said chamber by moving a position of a tube in accordance with an observed particle distribution in said chamber using the data obtained from said means for monitoring.

41. An apparatus for concentrating particles in a fluid, comprising:

a chamber having a rectangular parallelepiped space for containing said fluid, and being at least partially constructed of a material which is permeable to light, first and second plurality sets of piezoelectric devices, each of said first and second plurality sets being attached to a set of opposite outer faces of said chamber and arranged parallel to a flow within said rectangular parallelepiped space so as to introduce ultrasound energy into the chamber perpendicular to said flow's direction, said first and second plurality sets each being arranged such that a sub-plurality of said piezoelectric devices are lined up in each of two different directions so as to form a two-dimensional array, and each of said piezoelectric devices being driven independently of each other and irradiating an ultrasound beam, an ultrasonic control section which supplies sinusoidal electric voltages with at least one of different phases simultaneously and different intensities simultaneously to differing said piezoelectric devices, a width of said rectangular parallelepiped space perpendicular to said fluid flow in said chamber is $\lambda/2$ or a multiple of $\lambda/2$, and a thickness of a wall of a face of said chamber perpendicular to said fluid flow is $\lambda/2$ or a multiple of $\lambda/2$, where $\lambda$ is a wavelength of said ultrasound generated by said piezoelectric devices, means for monitoring a distribution of said particles in said chamber by an optical method, and a means for extracting a portion of fluid from said chamber, and means for controlling an extraction place in said chamber by moving a position of a tube in accordance with an observed particle distribution in said chamber using the data obtained from said means for monitoring.

42. An apparatus for handling particles comprising:
a chamber containing fluid in which said particles are distributed,
a plurality of piezoelectric devices driven independently of each other, and which are attached to outer face of said chamber to introduce ultrasound energy into said chamber, said plurality of piezoelectric devices being arranged in a two-dimensional array having a first sub-plurality of piezoelectric devices substantially aligned in a first direction and a second sub-plurality of piezoelectric devices substantially aligned in a second direction, and
an ultrasonic control section which supplies at least one of variable sinusoidal electric voltages and variable phases to each of said piezoelectric devices according to a relative position between said piezoelectric devices, in order to form a predetermined force potential well, in order that said force potential well can be formed at any position in said chamber by a ultrasound irradiated from said piezoelectric devices, and can manipulate said particles to any position in said chamber.

43. An apparatus for concentrating particles in a fluid, comprising:
a chamber having a substantially rectangular parallelepiped space for containing said fluid in which said particles are distributed, said chamber comprising a material which is permeable to light,
a plurality of piezoelectric devices attached to said chamber such that a sub-plurality of said piezoelectric devices are lined up in each of two different directions on a predetermined surface of said chamber, and each piezoelectric device faces said predetermined surface so as to form a two-dimensional array of piezoelectric devices upon said predetermined surface, and each of said piezoelectric devices being driven independently of each other and irradiating an ultrasound beam in a direction substantially perpendicular to said predetermined surface of said two-dimensional array, and
an ultrasonic control section which supplies sinusoidal electric voltages with at least one of different phases simultaneously and different intensities simultaneously to differing said piezoelectric devices,
means for monitoring a distribution of said particles in said chamber by an optical method, and
means for extracting a portion of fluid from said chamber, and means for controlling an extraction place in said chamber by moving a position of a tube in accordance with an observed particle distribution in said chamber using the data obtained from said means for monitoring.

44. An apparatus for handling particles comprising:
a chamber containing solution in which said particles are suspended;
an ultrasonic wave generator being arranged in said solution and being formed by ultrasonic generating elements arranged in two dimensions in a flat plane, each of said ultrasonic generating elements being driven independently of each other, and
an ultrasonic control section which controls an amplitude and a phase of waveform each of ultrasonic waves generated by said ultrasonic generating elements so as to focus the ultrasonic waves at a predetermined position at which said particles are to be trapped in said chamber.

45. An apparatus for handling particles comprising:
a chamber containing solution in which said particles are suspended;
a first ultrasonic wave generator being arranged in said solution and being formed by first ultrasonic generation elements arranged in two dimensions in a first flat plane, each of said first ultrasonic generating elements being driven independently of each other;
a second ultrasonic wave generator being arranged in said solution and being formed by second ultrasonic generating elements arranged in two dimensions in a second flat plane which is parallel to said first flat plane, each of said second ultrasonic generating elements being driven independently of each other; and
an ultrasonic control section which controls selection of the number and positions of said first and second ultrasonic generating elements, and controls an amplitude and a phase of waveform of each of ultrasonic waves generated by said selected first and second ultrasonic generating elements so as to focus the ultrasonic waves at a predetermined position at which said particles are to be trapped in said chamber.

46. An apparatus for handling particles comprising:
a chamber containing solution in which said particles are suspended;
an ultrasonic wave generator being arranged in said solution and being formed by ultrasonic generating elements arranged in two dimensions in a flat plane, each of said ultrasonic generating elements being driven independently of each other; and
an ultrasonic control section which controls an amplitude and a phase of waveform of each of ultrasonic waves generated by said ultrasonic generating elements so as to focus the ultrasonic waves at a direction to a predetermined position at which a minimum point of a force potential is to be formed by superposition of the gradient force fields by said ultrasonic generating elements.

* * * * *